US005477679A

United States Patent [19]

Tatsumi et al.

[11] Patent Number: 5,477,679

[45] Date of Patent: Dec. 26, 1995

[54] APPARATUS FOR CONTROLLING REVOLUTION SPEED OF PRIME MOVER FOR HYDRAULICALLY PROPELLED WORK VEHICLE

[75] Inventors: Akira Tatsumi, Kashiwa; Mitsuo Kihara; Seiji Tamura, both of Ibaragi; Hideaki Sayama, Tsuchiura; Saburou Yoshio, Ibaragi; Kazuo Asano, Tsuchiura; Junichi Hosono, Ibaragi, all of Japan

[73] Assignee: Hitachi Construction Machinery Co., Ltd., Tokyo, Japan

[21] Appl. No.: 39,148

[22] PCT Filed: Oct. 16, 1990

[86] PCT No.: PCT/JP90/01333

§ 371 Date: May 19, 1993

§ 102(e) Date: May 19, 1993

[87] PCT Pub. No.: WO92/07145

PCT Pub. Date: Apr. 30, 1992

[51] Int. Cl.[6] .......................... F16D 31/02; B60K 31/10

[52] U.S. Cl. .......................... 60/431; 180/176; 417/10; 417/34

[58] Field of Search .......................... 60/431, 459, 368; 180/175, 176, 177; 417/10, 34

[56] References Cited

U.S. PATENT DOCUMENTS

| | | | |
|---|---|---|---|
| 3,963,091 | 6/1976 | Noddings et al. | 180/176 X |
| 4,445,329 | 5/1984 | Drisko | 60/431 |
| 4,836,165 | 6/1989 | Kubota et al. . | |
| 5,197,860 | 3/1993 | Nishida et al. | 417/34 |

FOREIGN PATENT DOCUMENTS

| | | | |
|---|---|---|---|
| 0265526 | 5/1988 | European Pat. Off. . | |
| 5-38705 | 3/1977 | Japan . | |
| 58-45542 | 3/1983 | Japan . | |
| 0150839 | 7/1986 | Japan | 60/431 |
| 0077244 | 4/1987 | Japan | 60/431 |
| 62-233430 | 10/1987 | Japan . | |
| 2-190536 | 7/1990 | Japan . | |
| 87/05968 | 10/1987 | WIPO . | |

*Primary Examiner*—Edward K. Look
*Assistant Examiner*—Hoang Nguyen
*Attorney, Agent, or Firm*—Oliff & Berridge

[57] ABSTRACT

A prime mover revolution speed control system for a hydraulically propelled vehicle controls the revolution speed of a prime mover to optimize vehicle acceleration in a vehicle propelling mode, and to optimize engine output and economy in a working mode. A vehicle equipped with the control system may include a hydraulic pump for discharging hydraulic fluid, the amount of fluid discharged depending on the revolution speed of the prime mover, a hydraulic motor for vehicle propulsion that is driven by hydraulic fluid discharged from the hydraulic pump, and an actuator for performing work that is also driven by hydraulic fluid discharged from the hydraulic pump. The revolution speed of the prime mover may be controlled according to a depression amount of a revolution speed control pedal. When the control system is in the working mode, the revolution speed of the prime mover is controlled in accordance with revolution speed characteristics suitable for a working operation. When the control system is in the vehicle propelling mode, the revolution speed of the engine is controlled in accordance with revolution speed characteristics suitable for a vehicle propelling operation.

11 Claims, 13 Drawing Sheets

APPARATUS FOR CONTROLLING REVOLUTION SPEED OF PRIME MOVER FOR HYDRAULICALLY PROPELLED WORK VEHICLE

TECHNICAL FIELD

This invention relates to an apparatus for controlling the revolution speed of a prime mover for use in a hydraulically propelled work vehicle such as a wheel type hydraulic shovel or the like.

BACKGROUND ART

FIG. 13 shows a conventional revolution-speed controlling apparatus for a wheel type hydraulic shovel.

In FIG. 13, discharge oil from a hydraulic pump 1 which is driven by an engine (prime mover) 21 is conducted through a hydraulic pilot type of control valve 2 to a hydraulic motor 4 for vehicle propulsion. The changeover operation of the control valve 2 is controlled by a pilot hydraulic circuit comprising a hydraulic pump 5, a pilot valve 6, a slow return valve 7 and a forward/reverse changeover valve 8.

The revolution speed of the engine 21 is controlled by a governor 21*a* connected through a link mechanism 22 to a fuel lever 23. Upon manipulation of the fuel lever 23, the revolution speed of the engine 21 is adjustable to a desired value in accordance with the manipulation amount of the fuel lever. The governor 21*a* is also connected through a link mechanism 24 to a vehicle-propelling pedal 6*a*. Upon an step-on operation of the pedal 6*a*, simultaneously with the changeover control of the control valve 2, the revolution speed of the engine 21 can be also controlled in accordance with the operation amount of the pedal 6*a*.

Upon the step-on operation of the vehicle-propelling pedal 6*a* while the forward/reverse changeover valve 8 is switched to its F-position (forward propulsion position) or R-position (reverse propulsion position), the discharge pressure of the hydraulic pump 5 is controlled by the pilot valve 6, and the pressure which is dependent on the operation amount of the pedal 6*a* is conducted through the slow return valve 7 and the forward/reverse changeover valve 8 to a control port 2*a* or 2*b* of the control valve 2. At this time, the control valve 2 is changed over in a predetermined direction by a predetermined amount, and only an amount of discharge oil corresponding to the changeover amount of the control valve 2 which is a part of the discharge oil of the hydraulic pump 1 rotating in accordance with the operation amount of the vehicle-propelling pedal 6*a* is conducted to the hydraulic motor 4. Through this operation, the hydraulic motor 4 is driven, and a vehicle is forwardly or reversely propelled at a speed corresponding to the operation amount of the vehicle-propelling pedal 6*a*.

The discharge oil from the hydraulic pump 1 as described above is also conducted through a control valve 51 to a working cylinder for work (working actuator) 52. The control valve 51 is operated by a working lever 51*a* to allow the cylinder 52 to be stretched and contracted, whereby a working attachment as not shown is driven to perform a work. If the forward/reverse changeover valve 8 is switched to a neutral position (N-position) at a working time, the control of the engine revolution speed as described above can be performed through the operation of the vehicle-propelling pedal, and thus a finer control (finer adjustment) can be performed than that when the revolution speed control is carried out using the fuel lever 23. Therefore, the engine revolution speed is not required to be undesirably increased, and prevention of noise and improvement in fuel consumption can be performed.

In this kind of construction machine, it is generally required to use the engine at a higher revolution speed range in a vehicle-propelling operation than in a working operation, and in addition the rapid rise-up of the engine revolution speed in response to the operation of the vehicle-propelling pedal 6*a* is required. However, in the conventional apparatus has a disadvantage that when the engine output is controlled by the vehicle-propelling pedal 6*a*, the highest revolution speed (maximum output) and the revolution-speed characteristic of the engine 21 can not be altered in both of the vehicle-propelling operation and the working operation. That is, when the engine revolution speed characteristic is beforehand fixedly set to a characteristic which is suitable for the working operation for example, the acceleration of the engine in the vehicle-propelling operation is deteriorated, and conversely when the engine revolution speed characteristic is beforehand fixedly set to a characteristic which is suitable for the vehicle-propelling operation, the operation performance in the working operation is deteriorated, and in addition the fuel consumption and the noise rise up.

An object of this invention is to provide an apparatus for controlling the revolution speed of a prime mover for a hydraulically propelled vehicle in which the revolution speed characteristic of the prime mover can be altered in both vehicle-propelling operation and working operation.

A diesel engine control apparatus in which an engine torque characteristic is altered in accordance with the vehicle propulsion and the work is disclosed in Japanese Laid-open Patent Application No. 62-233430. This apparatus is equipped with two kinds of maximum injection amount characteristics for the engine revolution speed which are provided for the vehicle propulsion and the work, respectively. However, the revolution speed characteristic for the step-on amount of the vehicle-propelling pedal (for example, the rise-up characteristic of the revolution speed for the step-on amount of the vehicle-propelling pedal) is not set selectively in accordance with the vehicle propulsion and the work. Therefore, it is unlikely that all the problems as described above are solved.

DISCLOSURE OF INVENTION

The invention as claimed in claims 1 and 2 is applicable to an apparatus for controlling the revolution speed of a prime mover for a hydraulically propelled vehicle equipped with a prime mover, a hydraulic pump for discharging pressure oil whose discharge amount corresponds to the revolution speed of the prime mover, a hydraulic motor for vehicle propulsion which is driven by the discharge oil from the hydraulic pump in a vehicle-propelling operation, an actuator for work which is driven by the discharge oil from the hydraulic pump in a working operation and a vehicle-propelling pedal for controlling a vehicle-propulsion speed in accordance with an operation amount of the vehicle-propelling pedal in the vehicle-propelling operation.

The invention as claimed in claim 1 is characterized by including operation amount detecting means for detecting the operation amount of the vehicle-propelling pedal, status detecting means for detecting at least the working operation, and revolution speed control means for setting a target revolution speed of the prime mover suitable for the working operation in accordance with the operation amount of the vehicle-propelling pedal when the working operation is detected by the status detecting means, and setting a target revolution speed of the prime mover suitable for the vehicle-propelling operation in accordance with the operation amount of the vehicle-propelling pedal when at least the working operation is not detected by the detecting means, thereby controlling the revolution speed of the prime mover on the basis of the set target revolution speed.

Therefore, according to the invention as claimed in claim 1, the revolution speed of the prime mover is controlled in accordance with the operation amount of the vehicle-propelling pedal on the basis of the revolution speed characteristic suitable for a work in the working operation, and on the basis of the revolution speed characteristic suitable for vehicle propulsion in the vehicle-propelling operation.

The invention as claimed in claim 2 is characterized by further including manual operation means for outputting a signal indicating the working operation by manual operation before the work is carried out, and inhibiting means for inhibiting the vehicle propulsion in response to the signal indicating the working operation.

Therefore, according to the invention as claimed in claim 2, when an operator's intention of carrying out the work is indicated by the operation of the manual operation means, the vehicle propulsion is inhibited, so that safety is more improved.

The invention as claimed in claim 3 is particularly applicable to an apparatus comprising the apparatus for controlling the revolution speed of the prime mover for use in the hydraulically propelled vehicle to which the claims 1 and 2 are applied, and brake means for restricting the vehicle in the working operation.

The invention as claimed in claim 3 is characterized by including brake detecting means for detecting the actuation of the brake means, operation-amount detecting means for detecting the operation amount of the vehicle-propelling pedal, and revolution speed control means for controlling the revolution speed of the prime mover in accordance with the operation amount of the vehicle-propelling pedal on the basis of the revolution speed characteristic of the prime mover which is suitable for the working operation when the actuation of the brake means is detected by the brake detecting means, and controlling the revolution speed of the prime mover in accordance with the operation amount of the vehicle-propelling pedal on the basis of the revolution speed characteristic of the prime mover which is suitable for the vehicle-propelling operation at least when the actuation of the brake means is not detected by the brake detecting means.

Therefore, according to the claim 3, when the actuation of the brake means is detected by the brake detecting means, the revolution speed characteristic suitable for the work is selected. On the other hand, when the actuation of at least the brake means is not detected by the brake detecting means, the revolution speed characteristic suitable for the vehicle propulsion is selected. As a result, the operation feeling in the working operation, the fuel consumption and the noise can be particularly improved.

The invention as claimed in claim 4 is particularly applied to an apparatus comprising the apparatus for controlling the revolution speed of the prime mover for use in the hydraulically propelled vehicle to which the claims 1 and 2 are applied, brake means for restricting the vehicle in the working operation, and changeover means which is switchable to a neutral position where supply of pressure oil to at least the hydraulic motor for vehicle propulsion is intercepted.

The invention as claimed in claim 4 is characterized by including brake detecting means for detecting the actuation of the brake means, operation amount detecting means for detecting the operation amount of the vehicle-propelling pedal, switching position detecting means for detecting the location of the changeover means at a neutral position, and revolution speed control means for controlling the revolution speed of the prime mover in accordance with the operation amount of the vehicle-propelling pedal on the basis of the revolution speed characteristic of the prime mover which is suitable for the working operation when the actuation of the brake means is detected by the brake detecting means and the location of the changeover means at the neutral position is detected by the neutral position detecting means, and controlling the revolution speed of the prime mover in accordance with the operation amount of the vehicle-propelling pedal on the basis of the revolution speed characteristic of the prime mover which is suitable for the vehicle-propelling operation when the actuation of the brake means is not detected by at least the brake detecting means and the location of the changeover means at the neutral position is not detected by the neutral position detecting means.

Therefore, according to the invention as claimed in claim 4, when the actuation of the brake means is detected by the brake detecting means and the location of the changeover means at the neutral position is detected by the neutral position detecting means, the revolution speed characteristic suitable for the work is selected. On the other hand, when the actuation of at least the brake means is not detected and the location of the changeover means at the neutral position is not detected, the revolution speed suitable for the vehicle propulsion is selected.

The invention as claimed in claim 5 is characterized in that in the apparatus for controlling the revolution speed of the prime mover for use in the hydraulically propelled vehicle as claimed in claim 4, the changeover means is so designed as to be switchable among the neutral position as described above, a forward propulsion position where the pressure oil from the hydraulic pump is supplied to the hydraulic motor for vehicle propulsion so that the vehicle can be forwardly propelled, and a reverse propulsion position where the pressure oil from the hydraulic pump is supplied to the hydraulic pump for vehicle propulsion so that the vehicle can be reversely propelled, in that the neutral position detecting means is so designed as to detect the location of the changeover means at the forward propulsion position or the reverse propulsion position, and in that the revolution speed of the prime mover is controlled by the revolution speed control means as follows. When the actuation of the brake means is detected by the brake detecting means and the neutral position of the changeover means is detected by the neutral position detecting means, the revolution speed of the prime mover is controlled in accordance with the operation amount of the vehicle-propelling pedal on the basis of the revolution speed characteristic of the prime mover which is suitable for the working operation. On the other hand, when the actuation of the brake means is not detected by at least the brake detecting means and the forward or reverse propulsion position of the changeover means is detected by the switching position detecting means, the revolution speed of the prime mover is controlled in accordance with the operation amount of the vehicle-propelling pedal on the basis of the revolution speed characteristic of the prime mover which is suitable for the vehicle-propelling operation.

Therefore, according to the invention as claimed in claim 5, in a case where the changeover means is located at the neutral position at the actuation time of the brake, the revolution speed suitable for the work is selected. On the other hand, in a case where the changeover means is located at the forward or reverse propulsion position at the non-actuation time of the brake, the revolution speed suitable for the vehicle propulsion is selected.

The invention as claimed in claim 6 is applied to an apparatus comprising the apparatus for controlling the revolution speed of the prime mover for use in the hydraulically propelled vehicle as claimed in claim 4 or 5, and changeover control means for switching the changeover means to the neutral position when the actuation of the brake means is detected.

Therefore, according to the invention as claimed in claim 6, when the actuation of the brake means is detected, the changeover means is forcedly switched to the neutral position by the changeover control means. Accordingly, when an operator manipulates the brake means to carry out a work (for example, digging work), the erroneous propulsion by the vehicle-propelling pedal can be prevented.

The invention as claimed in claim 7 is characterized in that in the apparatus for controlling the revolution speed of the prime mover for the hydraulically propelled vehicle as claimed in claim 5 or 6, when the actuation of the brake means is detected and the location of the changeover means at the forward or reverse propulsion position is detected by the switching position detecting means, the revolution speed of the prime mover is controlled by the revolution speed control means to a predetermined low revolution speed.

Therefore, according to the invention as claimed in claim 7, when the actuation of the brake means is detected and the location of the changeover means at the forward or reverse propulsion position is detected by the switching position detecting means, the revolution speed of the prime mover is controlled to the predetermined low revolution speed. Accordingly, when a vehicle-propelling force and a braking force collide with each other, the vehicle-propelling force is prohibited, so that the erroneous propulsion can be prevented and the durability of the brake device can be improved.

The invention as claimed in claim 7 is characterized in that the apparatus for controlling the revolution speed of the prime mover for the hydraulically propelled vehicle as claimed in any one of claims 3 to 6, revolution speed setting means for setting the revolution speed of the prime mover irrespective of the step-on amount of the vehicle-propelling pedal is provided, and the revolution speed control means is equipped with selection means for selecting larger one of the revolution speed set by the revolution speed setting means and the revolution speed determined in accordance with the step-on amount of the vehicle-propelling pedal.

Therefore, according to the invention as claimed in claim 7, larger one of the revolution speed set by the revolution speed setting means and the revolution speed determined in accordance with the step-on amount of the vehicle-propelling pedal on the basis of each of the revolution speed characteristics is selected, and thus the degree of freedom in revolution speed control by the vehicle-propelling pedal and the revolution speed setting means is expanded.

The invention as claimed in claim 8 is characterized in that in the apparatus for controlling the revolution speed of the prime mover for the hydraulically propelled vehicle as claimed in claim 7, the maximum value of the revolution speed suitable for the working operation is set to be larger than the maximum value of the revolution sped st by the revolution speed setting means.

Therefore, according to the invention as claimed in claim 8, the revolution speed can be prevented from being undesirably fixedly set to a high revolution speed.

The invention as claimed in claim 9 is applied to an apparatus comprising the apparatus for controlling the revolution speed of the prime mover for use in the hydraulically propelled vehicle to which the claims 1 and 2 are applied, and changeover means which is switchable to at least a neutral position where the supply of the pressure oil to the hydraulic motor for vehicle propulsion is intercepted.

The invention as claimed in claim 9 is characterized by including operation amount detecting means for detecting the operation amount of the vehicle-propelling pedal, switching position detecting means for detecting the location of the changeover means at the neutral position, and revolution speed control means for setting a target revolution speed of the prime mover suitable for the working operation in accordance with the operation amount of the vehicle-propelling pedal when the location of the changeover means at the neutral position is detected by the switching position detecting means, and setting a target revolution speed of the prime mover suitable for the vehicle-propelling operation in accordance with the operation amount of the vehicle-propelling pedal when the location of the changeover means at the neutral position is not detected by at least the switching position detecting means, thereby controlling the revolution speed for the prime mover on the basis of the set target revolution speed.

Therefore, according to the invention as claimed in claim 9, when the changeover means is located at the neutral position, the prime mover is driven with the revolution speed characteristic suitable for the work. On the other hand, when at least the changeover means is not located at the neutral position, the prime mover is driven with the revolution speed characteristic suitable for the vehicle propulsion.

The invention as claimed in claim 10 is characterized in that in the apparatus for controlling the revolution speed of the prime mover for the hydraulically propelled vehicle as claimed in claim 9, speed setting means which includes an operation member provided separately from the vehicle-propelling pedal and serves to set the target revolution speed of the prime mover in accordance with the operation amount of the operation member irrespective of the step-on amount of the vehicle propelling pedal, is provided and the revolution speed control means is equipped with selection means for selecting larger one of the target revolution speed set by the revolution speed setting means and the target revolution speed determined in accordance with the step-on amount of the vehicle-propelling pedal.

Therefore, according to the invention as claimed in claim 10, larger one of the target revolution speed set by the revolution speed setting means and the target revolution speed determined in accordance with the step-on amount of the vehicle-propelling pedal is selected, and thus the degree of freedom in revolution speed control by the vehicle-propelling pedal and the revolution speed setting means is expanded.

The invention as claimed in claim 11 is characterized in that in the apparatus for controlling the revolution speed of the prime mover for use in the hydraulically propelled vehicle as claimed in claim 10, the maximum value of the target revolution speed suitable for the working operation is set so as to be higher than at least the maximum value of the revolution speed set by the revolution speed setting means.

Therefore, according to the invention as claimed in claim 11, the prime mover can be prevented from being undesirably fixedly set to a high revolution speed.

BRIEF DESCRIPTION OF DRAWINGS

FIG. 1 is a diagram showing the whole construction of a revolution speed control apparatus according to this invention.

FIG. 2 is a side view of a wheel type hydraulic shovel.

FIG. 3 is a schematic diagram showing the construction of a controller.

FIG. 4 is a flowchart for a revolution speed control procedure.

FIG. 5 is a diagram showing the whole construction of the revolution speed control apparatus.

FIG. 6 is a schematic diagram showing the construction of a controller.

FIG. 10 is a diagram showing the whole construction of the revolution speed control apparatus.

FIG. 11 is a schematic diagram showing the construction of a controller.

BEST MODE FOR CARRYING OUT THE INVENTION

First Embodiment

A first embodiment in which this invention is applied to a revolution speed control apparatus for a wheel type hydraulic shovel will be described with reference to FIGS. 1 to 4.

Figure 2:
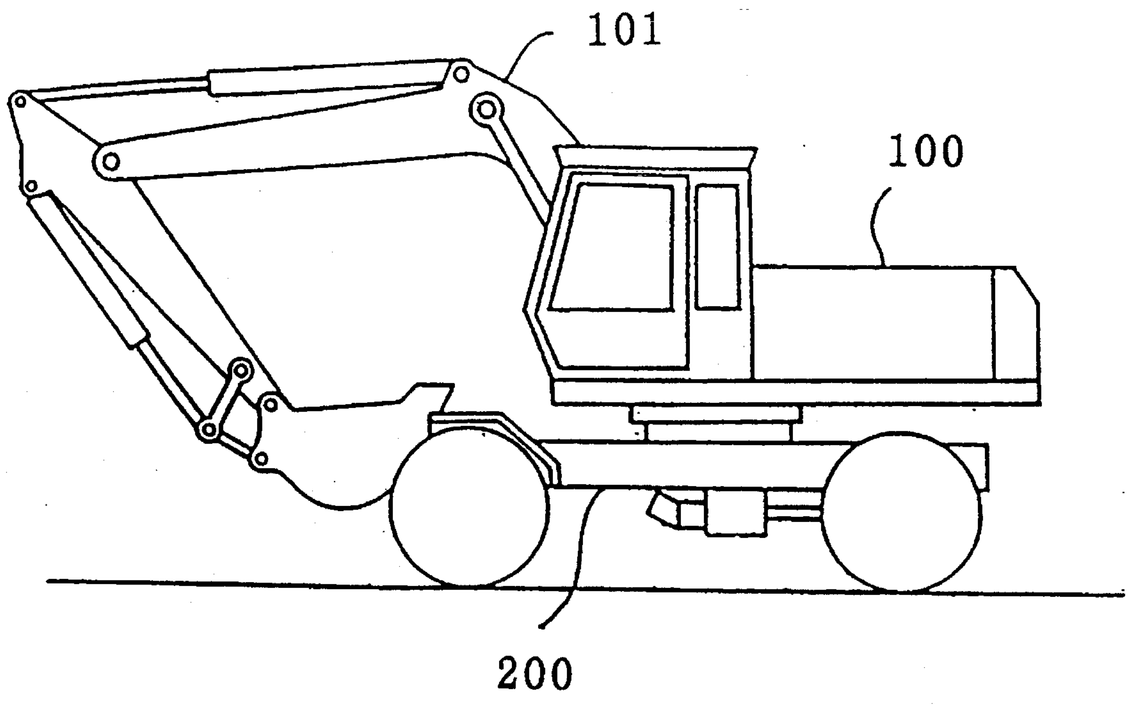

As shown in FIG. 2, the wheel type hydraulic shovel includes an upper swingable body 100 and a lower swingable body 200, and a working attachment 101 is secured to the upper swingable body 100.

Figure 1:
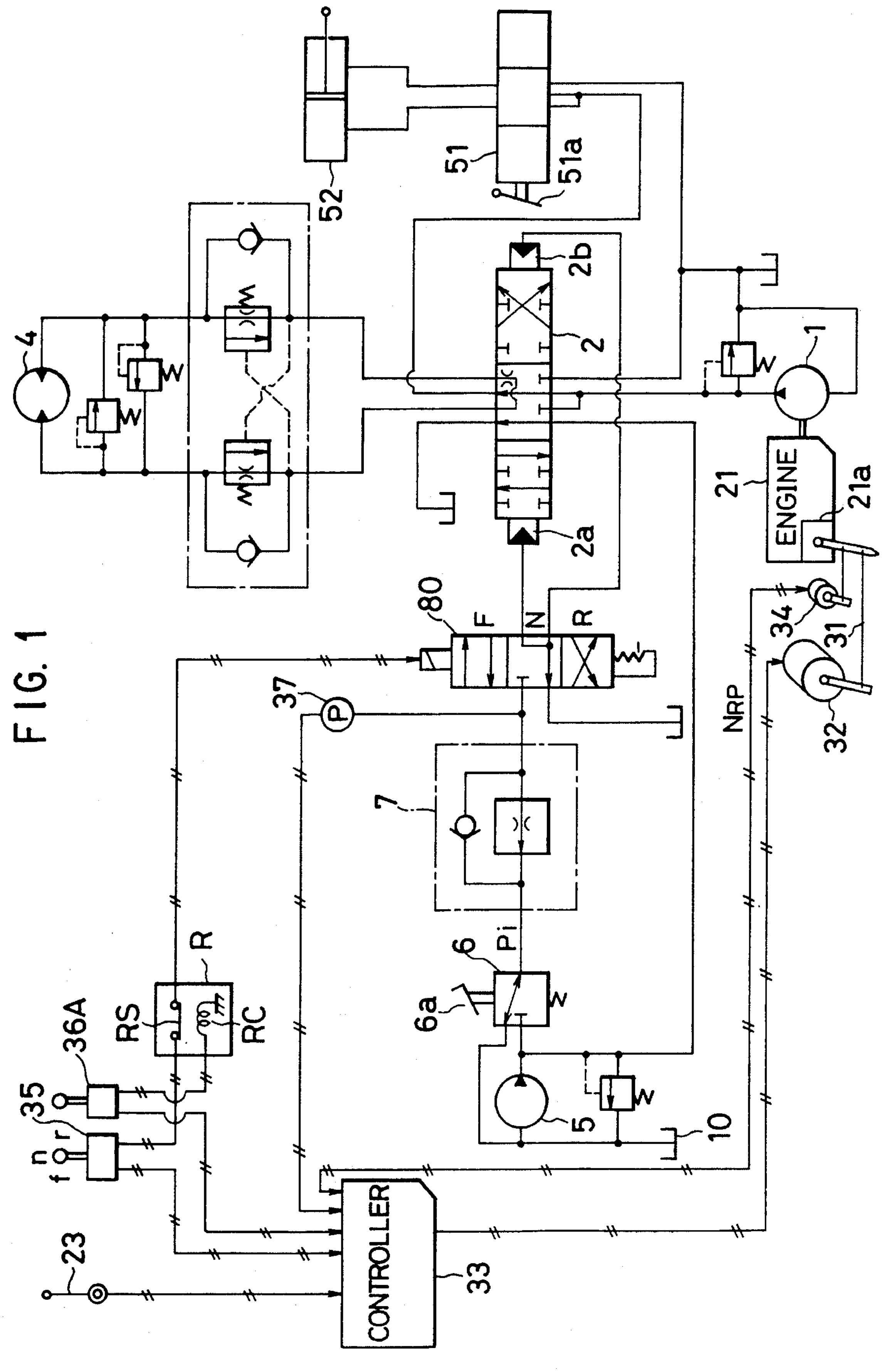
FIGS. 1 to 4 show a first embodiment of this invention.
Figure 13:
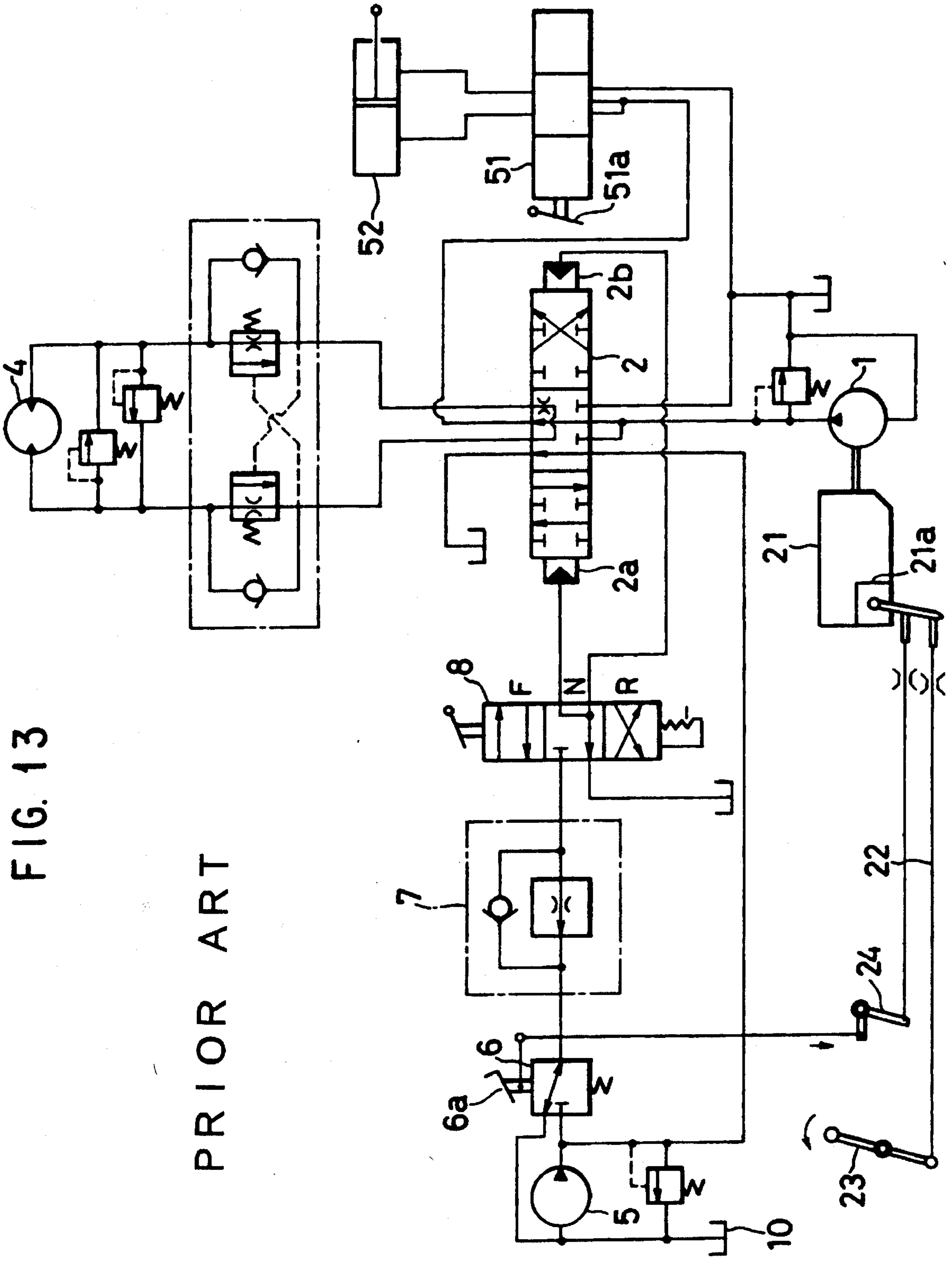
FIG. 13 PRIOR ART
FIG. 13 is a diagram showing the whole construction of a conventional revolution speed control apparatus.

FIG. 1 shows a hydraulic circuit for vehicle propulsion and a revolution speed control circuit for this kind hydraulic shovel. The same elements as those of FIG. 13 are represented by the same reference numerals, and different points will be mainly described.

A governor 21*a* of an engine (prime mover) 21 is connected through a link mechanism 31 to a pulse motor 32, and the revolution speed of the engine 21 is controlled through the rotation of the pulse motor 32. That is, the revolution speed is increased through the forward rotation of the pulse motor 32 while it is decreased through the reverse rotation thereof. The rotation of the pulse motor 32 is controlled by a control signal from a controller 33. The governor 21*a* is also connected to a potentiometer 34, and the position of a governor lever in accordance with the revolution speed of the engine 21 is detected by the potentiometer 34 to input a detection result to the controller 33 as a governor position detection value $N_{RP}$.

A fuel lever 23, a forward/reverse propulsion changeover switch 35 and a work selecting switch 36A which are provided in an operating room of the upper swingable body 100 are connected to the controller 33. A pressure gauge which is provided in a conduit between a pilot valve 6 and the forward/reverse propulsion changeover valve 80 is connected to the controller 33. The fuel lever 23 serves to vary the revolution speed of the engine 21 through a manual operation, and outputs a signal in accordance with the operation amount thereof. The forward/reverse propulsion changeover switch 35 is also connected through a constantly-closed contact point RS of a relay R to a solenoid portion of the forward/reverse propulsion changeover valve 80, and serves to output switching signals for instructing the switching operation of the forward/reverse propulsion changeover valve 80 to N, F and R positions respectively through the switching operation of the forward/reverse propulsion changeover switch 35 to one of n, f and r positions. These switching signals are also input to the controller 33.

The work selection switch 36A is a switch which is switched on when a work other than the vehicle propulsion is carried out by an operator, and an on/off state of the switch 36 is input to the controller 33. The work selection switch 36A is also connected to a relay coil RC, and the relay coil RC is excited in response to the switch-on of the switch 36. Upon excitation of the coil RC, the constantly-closed contact point RS as described above is opened, and in this state the forward/reverse propulsion switch 35 and the forward/reverse propulsion changeover valve 80 are interrupted from each other, so that the forward/reverse propulsion changeover valve 80 is kept at the neutral position (N-position) even if the switch is manipulated to be located at the f-position or r-position.

The pressure gauge 37 serves to detect pilot pressure Pi which is generated in proportion to the operation amount of the vehicle-propelling pedal 6*a*, and input the detection result to the controller 33. The pilot pressure Pi becomes a value which corresponds to the operation amount of the vehicle-propelling pedal 6*a*.

Figure 3:
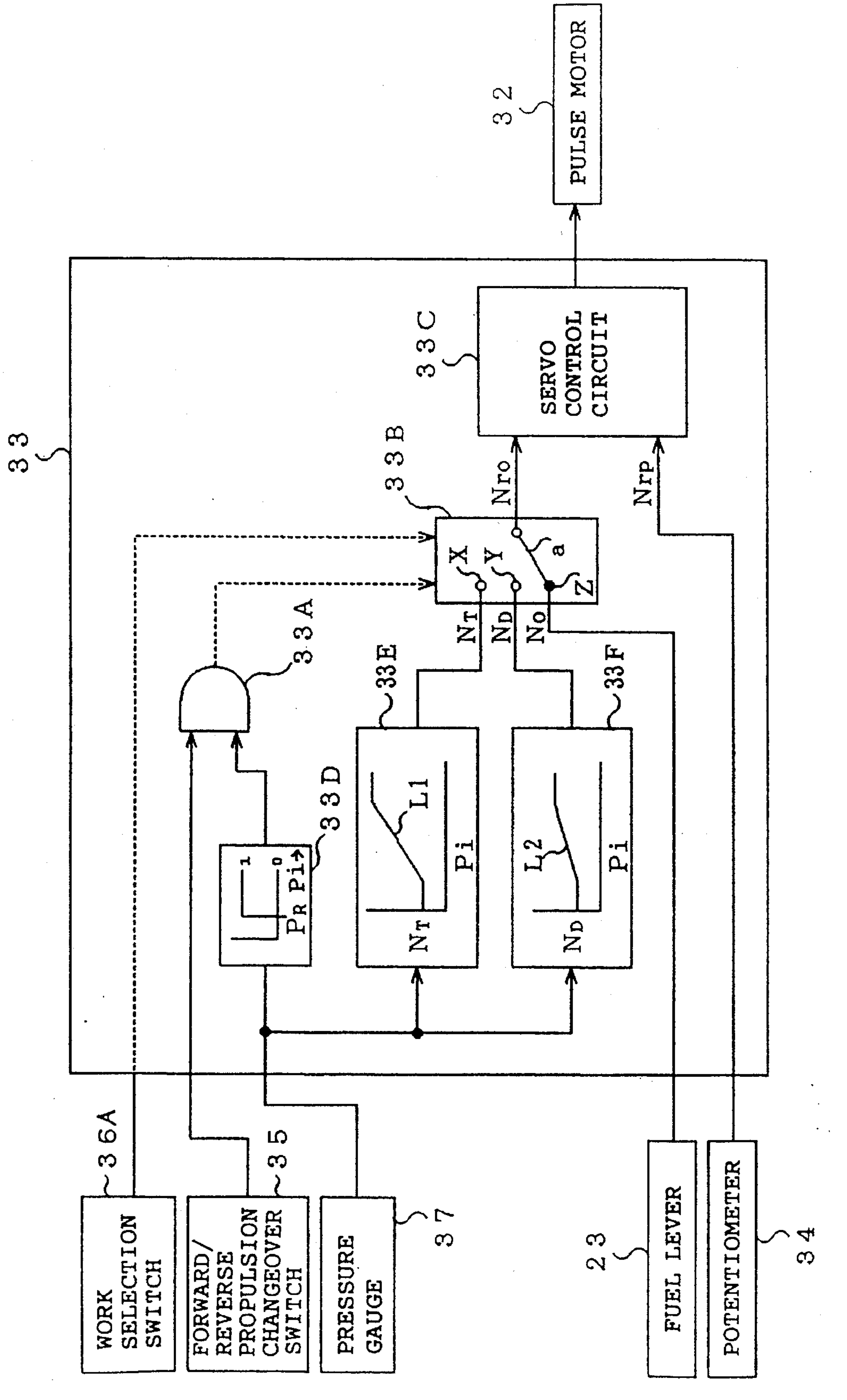

FIG. 3 is a schematic diagram of explaining the details of the controller 33.

The controller 33 includes an AND gate circuit 33A, a selection circuit 33B, a servo control circuit 33C and three function generators 33D to 33F, and an on/off signal from the work selection switch 36A is input to the selection circuit 33B. An on/off signal from the forward/reverse propulsion change-over switch 35 is input to one input terminal of the AND gate circuit 33A, the signal indicating the pilot pressure Pi detected by the pressure gauge 37 is input to the function generator 33D, and the output of the function generator 33D is input to the other terminal of the AND gate circuit 33A. The output of the AND gate circuit 33A is input to the selection circuit 33B. The function generators 33E and 33F output functions (revolution speed characteristics) L1 and L2 with which the corresponding relationship between the pilot pressure Pi and the revolution speed of the engine 21 is set. The function L1 corresponds to a revolution speed characteristic for vehicle propulsion which is suitable for a vehicle-propelling operation, and the function L2 corresponds to a revolution speed characteristic for work which is suitable for a working operation using a working attachment 101. That is, L1 has a sharper rise-up than L2, and the highest revolution speed of L1 is also set to a higher value.

The selection circuit 33B is constructed by a switch comprising three contact points X, Y and Z and a movable contact point a, and the movable contact point a is usually connected to a constantly-closed contact point Z. The movable contact point a is switched to Y or X on the basis of signals input from the work selection switch 36A and the AND gate circuit 33A to select one of the engine revolution speed signals output from the function generator 33E and 33F in accordance with the switching position thereof, and the selected signal is output to the servo control circuit 33C as a governor lever position target value Nro. When the movable contact point a is located at the Z position, the engine revolution speed which is adjusted by the fuel lever 23 is selected.

Figure 4:
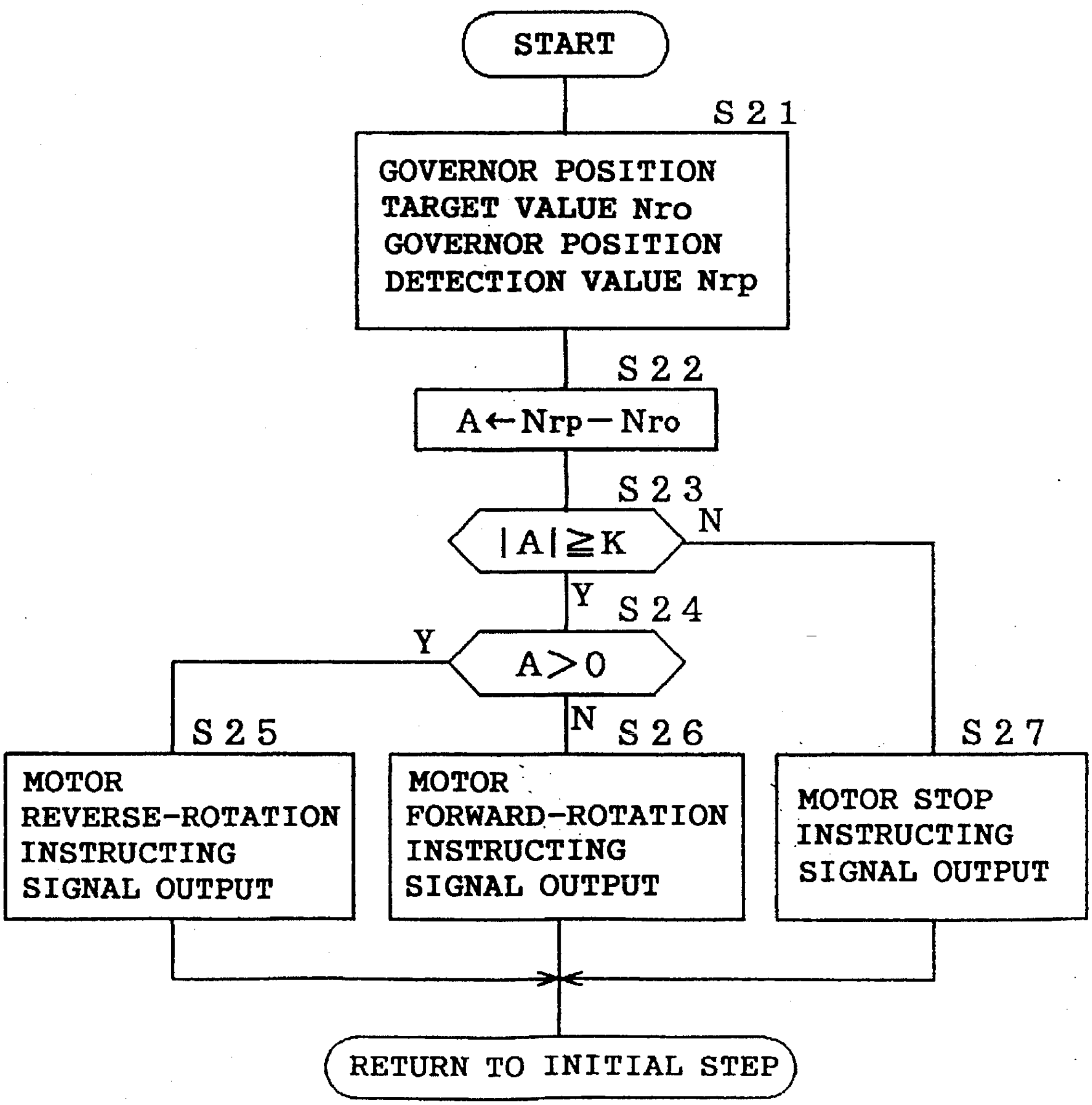

The servo control circuit 33C is supplied with a current engine revolution speed from the potentiometer 34 as described above, that is, a governor lever position detection value Nrp, and a control for altering the engine revolution speed to the governor lever position target value Nro according to the procedure as shown in FIG. 4 is carried out.

In FIG. 4, at a step S21 the governor lever position target value Nro and the governor lever position detection value Nrp are read out, and then the process goes to a step S22. At a step S22, the result of Nrp—Nro is stored as a revolution speed difference A in a memory. At a strep S23, using a reference revolution speed difference K which is beforehand set, it is judged whether $|A| \geqq K$. If the judgement is "Yes", the process goes to a step S24, and it is judged whether the revolution speed difference A>0. If A>0, the governor lever position detection value Nrp is judged to be larger than the governor lever position target value Nro, that is, the control revolution speed is judged to be higher than the target revolution speed. Therefore, at a step S25, a signal instructing the motor reverse rotation is output to the pulse motor 32 to lower the engine revolution speed. Through this operation, the pulse motor 32 is reversely rotated, and the revolution speed of the engine 21 is lowered. If $A \leqq 0$, the governor lever position detection value Nrp is judged to be smaller than the governor lever position target value Nro, that is, the control revolution speed is judged to be lower than the target revolution speed. Therefore, at a step S26, a signal indicating the motor forward rotation is output to increase the engine revolution speed. Through this operation, the pulse motor 32 is forwardly rotated, and the revolution speed of the engine 21 is increased. If the judgment at the step S23 is "No", the process goes to a step S27 to output a motor stop signal, so that the revolution speed of the engine 21 is kept to a fixed value. After steps S25 to S27 are executed, the process returns to the initial step.

In the construction as described above, when the work selection switch **36*a* is switched on to start a work, the on-signal is input to the selection circuit 33B (FIG. 3), and the movable contact point a is connected to the contact point Y. Through this operation, the revolution speed characteristic L2 for work as described above is selected, and the signal indicating the engine revolution speed $N_D$ corresponding to the pilot pressure Pi input to the function generator 33F is output. This revolution speed $N_D$ is output as the governor lever position target value Nro to the servo control circuit 33C. The servo control circuit 33C** carries out its control operation in accordance with the procedure as described above so that the engine revolution speed is equal to the target value Nro ($N_D$).

Upon manipulation of the working lever **51*a* in this state to switch the control valve 51, discharge oil from the hydraulic pump 1 is conducted to the cylinder (actuator for work) 52, so that the working attachment 101 is driven. That is, a work is carried out under the revolution speed characteristic L2** for work.

Next, after the work selection switch 36A is switched off, the forward/reverse propulsion changeover switch 35 is switched to the f-position or r-position to switch the forward/reverse propulsion changeover valve 80 to the F-position or R-position. Subsequently, upon the operation of the vehicle-propelling pedal **6*a*, the switching operation of the control valve 2 is controlled by the action as described above, and the hydraulic motor 4 is driven by the discharge oil from the hydraulic pump 1**, so that the vehicle starts to run.

At this time, since the operation of the switch 35 causes the AND gate circuit 33A to be in an enable state, the function generator 33D outputs "1" when the pilot pressure Pi exceeds the reference value $P_R$ by the operation of the pedal **6*a*, so that the AND gate circuit 33A is switched on and outputs "1". In response to this operation, the movable contact point a of the selection circuit 33B is connected to the contact point X. Through this operation, the revolution speed characteristic L1 for vehicle propulsion is selected, and the signal indicating the engine revolution speed $N_T$ corresponding to the pilot pressure Pi input to the function generator 33E is output. This revolution speed $N_T$ is output as the governor lever position target value Nro to the servo control circuit 33C. The servo control circuit 33C** performs its control operation according to the procedure as described above so that the engine revolution speed is equal to the target value Nro ($N_T$).

Through the above operations, the vehicle runs under the revolution speed characteristic L1 for vehicle propulsion.

On the other hand, when the work selection switch 36A is switched off and the forward/reverse propulsion switch 35 is located at the neutral position, the movable contact point a of the selection circuit 33B is connected to the constantly-closed contact point Z. In this case, the revolution speed No corresponding to the operation of the fuel lever 23 is input as the governor lever position target value Nro to the servo control circuit 33C. The engine revolution speed is controlled to the target value Nro (No) by the servo control circuit 33C.

As described above, when the work selection switch 36A is switched on, the vehicle is judged to be in a working state, and the revolution speed $N_D$ corresponding to the operation amount of the vehicle-propelling pedal **6*a* is selected from the revolution speed characteristic L2 for work, so that the revolution speed of the engine 21 is controlled to be equal to the revolution speed $N_D$. On the other hand, when the forward/reverse changeover switch 35 is located at the f-position or r-position and the vehicle-propelling pedal 6*a* is operated by a predetermined amount or more, the vehicle is judged to be in a vehicle-propulsion state, and the revolution speed $N_T$ corresponding to the operation amount of the pedal is selected from the revolution speed characteristic L1 for vehicle propulsion, and the revolution speed of the engine 21 is controlled to be equal to this revolution speed $N_T$. The rise-up of the revolution speed by the pedal operation is sharper in the revolution speed characteristic L1 for vehicle propulsion than in the revolution speed characteristic L2** for work, and thus there is no loss of acceleration in the vehicle-propelling operation. Further, in the working operation, the revolution speed is not undesirably increased to a high value, and the operation performance and the fuel consumption can be improved.

When the work selection switch 36A is in an on-state, the forward/reverse propulsion changeover valve 80 is kept at the neutral position (the running of the vehicle is inhibited) even if the forward/reverse switch 35 is located at the f-position or r-position, so that in a case where the revolution speed control is carried out by the operation of the vehicle-propelling pedal **6*a*, there is no possibility that the vehicle is undesirably propelled even when the operator forgets the switching operation of the forward/reverse changeover valve 80** to the neutral position.

Second Embodiment

A second embodiment in which this invention is applied to a revolution speed control apparatus for a wheel type hydraulic shovel will be described with reference to FIGS. 5 to 9.

Figure 5:
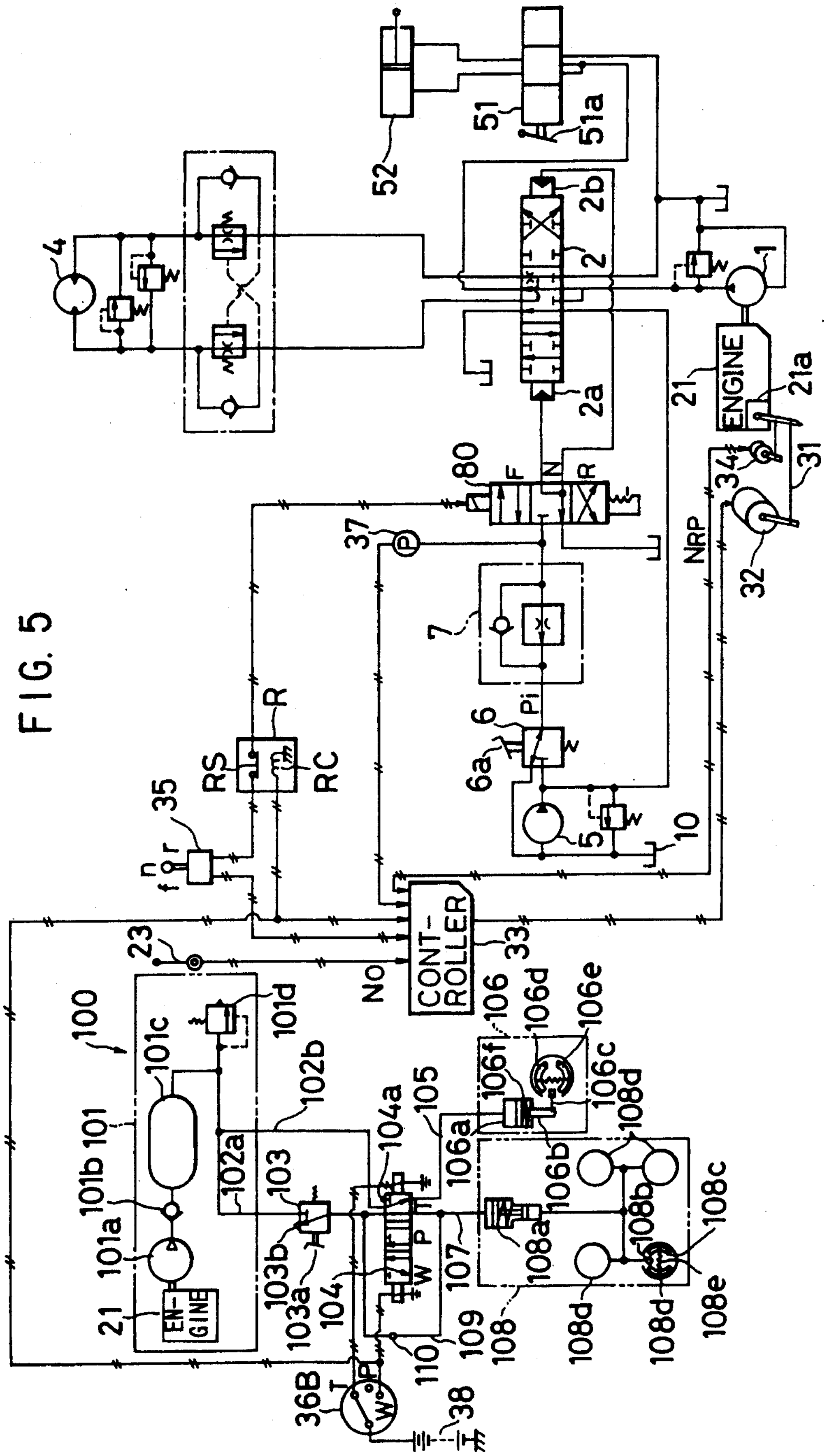
FIGS. 5 and 6 show a second embodiment of this invention.

FIG. 5 shows a hydraulic circuit for vehicle propulsion, a revolution speed control circuit and a brake circuit for this kind of hydraulic shovel. The different point from FIG. 1 resides in that the brake circuit is shown and that the work selection switch 36A as shown in FIG. 1 is omitted and it is substituted by the brake switch 36B. The same elements as those of FIG. 1 are represented by the same reference numerals.

In FIG. 5, a reference numeral 100 represents a brake system, and the brake system 100 includes a positive type main brake device 108 for applying a service brake with pressure air from a pressure air source 101 which serves to supply pressure air, a negative type parking brake device 106 in which the brake is released by the pressure air from the pressure air source 101 and the brake is applied by the discharge of the pressure air. In this embodiment, the main brake device 108 and the parking brake device 106 are set to be simultaneously actuated in the working operation. When such working brake actuation is detected, the engine revolution speed control by the vehicle-propelling pedal 6*a* on the basis of the revolution speed characteristic suitable for the working operation is allowed to be carried out. On the other hand, when the working brake actuation is not detected, the engine revolution speed control by the vehicle-propelling pedal 6*a* on the basis of the revolution speed characteristic suitable for the vehicle propulsion is allowed to be carried out.

The pressure air source 101 is constructed by connecting a delivery side of a compressor 101*a* operated by the engine 21 through a check valve 101*b* to an air tank 101*c*. In addition, a relief valve 101*d* for keeping the inner pressure of the air tank 101*c* to a constant value is provided. One input conduit 102*a* connected to the air tank 101*c* is connected to the input port of the brake valve for vehicle propulsion 103, and the other input conduit 102*b* is connected to one input port of the brake changeover valve 104. Further, the output port of the brake valve 103 for vehicle propulsion is connected to the other input port of the brake changeover valve 104. The brake valve 103 for vehicle propulsion outputs a pressure corresponding to the step-on amount of the pedal 103*a* to the output port, and the output port is communicated to an atmosphere port 103*b* when the pedal 103*a* is released. The brake changeover valve 104 is switched to each of a vehicle-propulsion position (T), a parking position (P) and a working position (W) by switching the brake switch 36B to each of terminals T, P and W, respectively. The brake changeover valve 104 is also provided with a discharge port 104*a*.

One output port of the brake changeover valve 104 is connected to the negative type parking brake device 106 through a conduit 105, and the other output port is connected to the positive type main brake device 108 through a conduit 107. The output port of the brake valve 103 for vehicle propulsion is connected to the main brake device 108 through a conduit 109 in which a check valve 110 is disposed, to thereby allow pressure air from the brake valve 103 for vehicle propulsion to directly flow into the main brake device 108.

The conduit 107 connected to the main brake device 108 is connected to the input port of an air-pressure/oil pressure converting booster 108*a*, and the output port thereof is connected to a brake cylinder 108*b* of each of plural wheels. The brake is applied when a brake shoe 108*c* is driven by the brake cylinder 108*b* to push a brake drum 108*d*. A reference numeral 108*e* represents a return spring.

The conduit 105 connected to the parking brake device 106 is connected to the input port of the air-pressure/oil-pressure converting booster 106*a*, and a piston rod 106*b* thereof is connected through a brake lever 106*c* to a brake shoe 106*d*. A brake drum 106*e* is pushed by the brake shoe 106*d* to apply the brake. A return spring 106*f* is freely movable inserted into the piston rod 106*b*, and the piston rod 106*b* is urged in such a direction that the restoring force of the spring enables the application of the parking brake at all times. Therefore, the parking brake device 106 serves to actuate its brake releasing operation when the pressure air is supplied, and to actuate its braking operation when the pressure air is discharged.

In the brake system 100 as described above, when the brake switch 36B is switched to the vehicle-propulsion position T, the brake changeover valve 104 is switched to the T-position as shown, and the pressure air is supplied from the pressure air source 101 to the parking brake device 106, so that the parking brake is in the non-actuation state. Further, by the step-on operation of the brake pedal 103*a*, the main brake device 108 is actuated in the vehicle propulsion, and the so-called service brake is actuated. When the brake switch 36B is switched to the work position W, the brake changeover valve 104 is switched to the W-position. Therefore, irrespective of the step-on operation of the brake pedal 103*a*, the main brake device 108 is supplied with the pressure air, so that the service brake is actuated. Simultaneously, the pressure air is discharged from the parking brake device 106, so that the parking brake is actuated. That is, a so-called working brake state where both of two brakes are simultaneously actuated is established. When the brake switch 36B is switched to the parking position P, the brake changeover valve 104 is switched to the P-position, and irrespective of the step-on operation of the brake pedal 103*a*, the pressure air is discharged from the parking brake device 106, so that the parking brake is actuated. The main brake device 108 is actuated by the step-on operation of the brake pedal 103*a*.

In FIG. 5, for example a double solenoid is used for the solenoid portion of the forward/reverse propulsion changeover valve 80. When the forward/reverse propulsion changeover switch 35 is manipulated to be located at the f-position, a spool the forward/reverse propulsion changeover valve 80 is pushed and the value 80 is switched to the F-position. When the forward/reverse propulsion changeover switch 35 is manipulated to be located at the r-position, the spool is pulled out and the valve 80 is switched to the R-position. Accordingly, the forward/reverse propulsion changeover switch 35 outputs a predetermined voltage at the f-position and r-position, and the output voltage thereof is zero at the n-position.

As described above, the brake switch 36B is selectively operated by the operator in accordance with each of the vehicle-propelling operation, the parking operation and the working operation, and its common terminal is connected to a battery 38 and W terminal is connected to the controller 33. The W terminal of the brake switch 36B is also connected to the relay coil RC, and the relay coil is excited in response to the switching operation of the switch 36B to the W-position. Upon excitation of the coil RC, the constantly-closed contact point RS as described above is opened. Therefore, in this state, the forward/reverse propulsion switch 35 and the forward/reverse propulsion changeover valve 80 are interrupted from each other, and the forward/reverse propulsion changeover valve 80 is kept at the neutral position N even if the switch 35 is manipulated to be located at the f-position or r-position.

Figure 6:
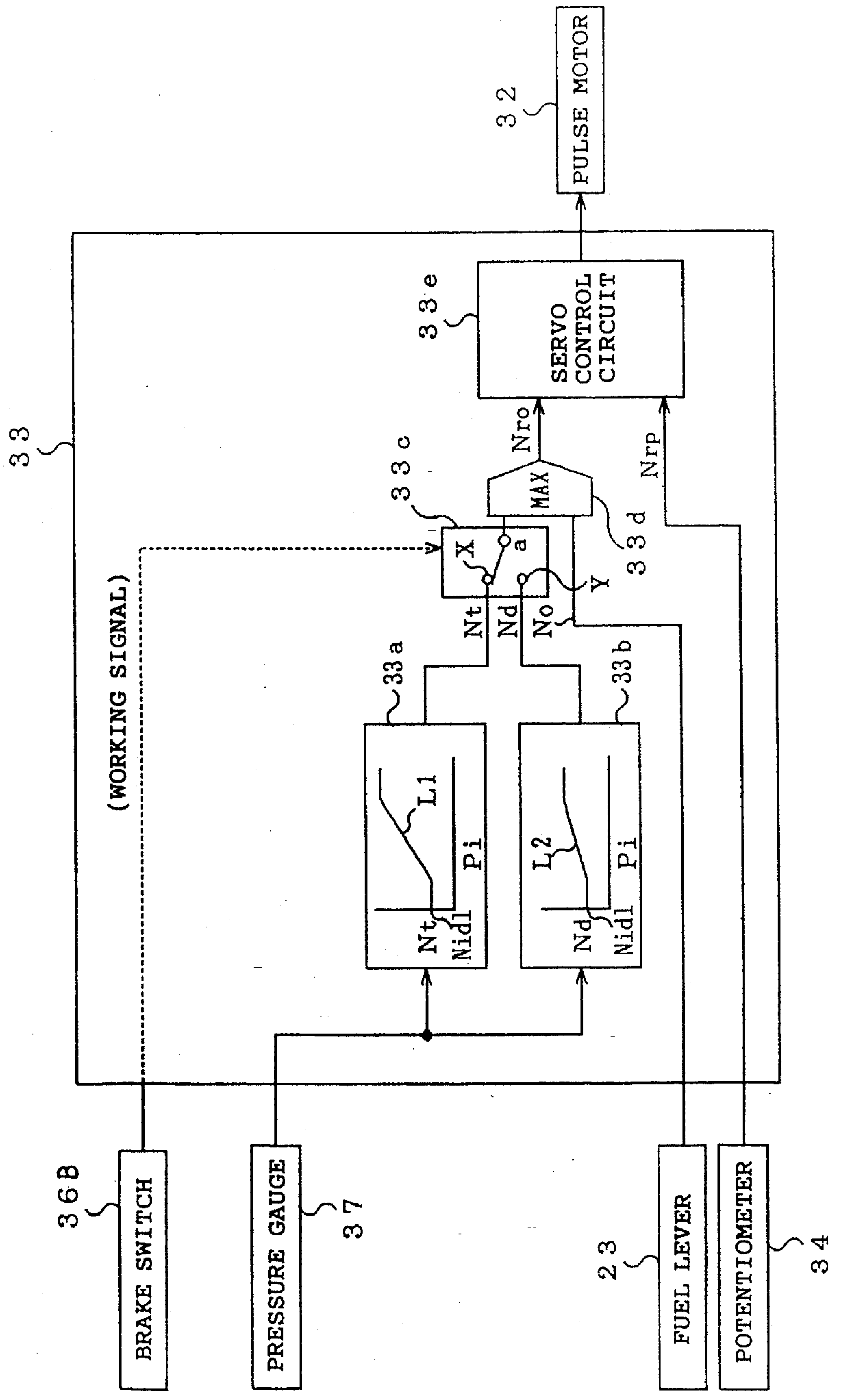

FIG. 6 is a block diagram showing the details of the controller 33.

The controller 33 includes two function generators 33*a* and 33*b*, a selection circuit 33*c*, a maximum value selection circuit 33*d* and a servo control circuit 33*e*, and a status signal at the W terminal of the brake switch 36B is input to the control terminal of the selection circuit 33*c*. In the following description, the state where the status signal is on is called as a state where a work signal is on. A signal indicating the pilot pressure Pi detected by the pressure gauge 37 is input to the function generators 33*a* and 33*b*. The function generators 33*a* and 33*b* output revolution speeds Nt and Nd which are determined on the basis of the functions (revolution speed characteristics) L1 and L2 with which the pilot pressure Pi and the revolution speed of the engine 21 correspond to each other, respectively. The function L1 is the revolution speed characteristic for vehicle propulsion which is suitable for a vehicle propelling operation, and L2 is the revolution speed characteristic for work which is suitable for a working operation using a working attachment. L1 has a sharper rise-up in revolution speed than L2, and the highest revolution speed of L1 is set to be higher than L2.

The selection circuit 33*c* is constructed by a switch including two contact points X and Y and a movable contact point a. The movable contact point a is usually connected to the constantly-closed contact point X, and is switched to the contact point Y when the work signal from the brake switch 36*b* becomes an on-state. The engine revolution speed signal from one of the function generator 33*a* or 33*b* is selected in accordance with the switching position of this contact point, and then input to the maximum value selection circuit 33*d*. The other input terminal of the maximum value selection circuit 33*d* is supplied with the revolution speed No from the fuel lever 23, and larger one of these revolution speeds thus input is input as a governor lever position target value Nro to the servo control circuit 33*e*. The servo control circuit 33*e* is supplied with the current engine revolution speed, that is, the governor lever position detection value Nrp from the potentiometer as described above, and according to the procedure of FIG. 4 as described above, the engine revolution speed is controlled to be altered to the governor lever position target value Nro.

In the construction as described above, when the brake switch 36B is switched to the W-position to start the work, as described above, both of the main brake device 108 and the parking brake device 106 are actuated to apply the working brake. At this time, the on-signal indicating the working state is input to the selection circuit 33*c* (FIG. 6), and the movable contact point a is connected to the contact point Y. Through this operation, the revolution speed characteristic L2 for work as described above is selected, and the signal indicating the engine revolution speed Nd corresponding to the pilot pressure Pi which is input to the function generator 33*b* is output. Thereafter, larger one of the revolution speed Nd and the revolution speed No determined by the fuel lever 23 is selected in the maximum value selection circuit 33*d*, and then output as the governor lever position target value Nro to the servo control circuit 33*e*. The servo control circuit 33*e* carries out its control operation in the procedure as described above so that the engine revolution speed is equal to the target value Nro (Nd or No).

When the brake switch 36B is switched to the W-position, the relay coil RC is supplied with current from the battery 38 through the W terminal of the brake switch 36B, so that the constantly-closed contact point RS is opened. Therefore, even if the forward/reverse propulsion switch 35 is located at the f-position or r-position, the forward/reverse propulsion changeover valve 80 is kept at the neutral position. When in this state the working lever 51*a* is manipulated to switch the control valve 51, the discharge oil is conducted from the hydraulic pump 1 to the cylinder (actuator for work) 52, so that the working attachment is driven.

That is, if the fuel lever 23 is manipulated to be located at an idling position, the work is carried out under the revolution speed characteristic L2 for work by the operation of the vehicle-propelling pedal 6*a*. At this time, there is no possibility that the vehicle is undesirably propelled even if the operator forgets the switching operation of the forward/reverse propulsion changeover valve 80 to the neutral position.

Next, when the brake switch 36B is switched to the T position, the parking brake device 106 is in the non-actuation state, so that the parking brake is released. When the forward/reverse propulsion changeover switch 35 is switched to the f-position or r-position, the forward/reverse propulsion changeover valve 80 is switched to the F-position or R-position. Upon the operation of the vehicle-propelling pedal 6*a*, the switching operation of the control valve 2 is controlled by the action as described above, and the hydraulic motor 4 is driven by the discharge oil from the hydraulic pump 1 so that the vehicle starts to run. Upon the operation of the brake pedal 103*a*, the main brake device 108 is actuated to actuate the service brake. At this time, the work signal to the selection circuit 33*c* is in the off-state, and the movable contact point a of the selection circuit 33*c* is connected to the contact point X. Through this operation, the revolution speed characteristic L1 for vehicle propulsion is selected, and the signal indicating the engine revolution speed Nt corresponding to the pilot pressure Pi which is input to the function generator 33*a* is output. The revolution speed Nt is compared with the revolution speed No in the maximum value selection circuit 33*d*, and larger one of these revolution speeds is output as the governor lever position target value Nro to the servo control circuit 33*e*. The servo control circuit 33*e* controls its control operation according to the procedure as described above so that the engine revolution speed is equal to the target value Nro (Nt or No).

If the fuel lever 23 is located at the idling position, the vehicle is propelled under the revolution speed characteristic L1 for vehicle propulsion by the operation of the vehicle-propelling pedal 6*a*.

When the vehicle-propelling pedal 6*a* is not operated, the pilot pressure Pi is not output, and thus the revolution speeds Nt and Nd output from the function generators 33*a* and 33*b* correspond to the idle revolution speed Nidl, respectively. In this case, larger one of the revolution speed No corresponding to the operation of the fuel lever 23 and the idle revolution speed Nidl is also selected, and then input as the governor lever position target value Nro to the servo control circuit 33*e*, so that the engine revolution speed is controlled to be equal to the target value Nro (No or Nidl) by the servo control circuit 33.

As described above, when the brake switch 36B is manipulated to be located at the W position, the controller 33 judges the vehicle to be in the working state, and the revolution speed Nd corresponding to the operation amount of the vehicle-propelling pedal 6*a* is selected from the revolution speed characteristic L2 for work is selected, so that the revolution speed of the engine 21 is controlled to be equal to the revolution speed Nd if the fuel lever 23 is manipulated to be located at the idling position. Further, when the brake switch 36B is switched to the T-position, the vehicle is judged to be in the vehicle-propulsion state, and the revolution speed Nt corresponding to the pedal operation amount is selected from the revolution speed characteristic L1 for vehicle propulsion, so that the revolution speed of the engine 21 is controlled to be equal to the revolution speed Nt. The revolution speed characteristic L1 for vehicle propulsion has a sharper rise-up in revolution speed by the pedal operation than the revolution speed characteristic L2 for work, and thus no loss in acceleration occurs in the vehicle-propelling operation. In addition, in the working operation, the revolution speed is prevented from being undesirably increased, and the operation performance and the fuel consumption are improved. Further, the revolution speed control by the vehicle-propelling pedal 6a is allowed only when the working brake acts, and at this time the running of the vehicle is inhibited because the forward/reverse propulsion changeover 80 is switched to the neutral position, so that the safety is more improved. Still further, the following advantages are obtainable because the engine revolution speed target value determined by the vehicle-propelling pedal 6a and the engine revolution speed target value determined by the fuel lever 23 are compared and larger one of them is selected by the maximum value selection circuit 33d.

When a working load is a heavy load, it is favorable to drive the engine at a high revolution speed. In this case, if the engine revolution speed is set to a high revolution speed range by the fuel lever 23, it is unnecessary to increase or decrease the revolution speed by frequently stepping on the vehicle-propelling pedal 6a. Therefore, a noise offensive to the ear which would be caused by the increase and decrease of the engine revolution speed can be prohibited, and occurrence of black smoke can be depressed. In addition, the fuel consumption can be improved. When the working load is a light load, an appropriate increase or decrease of the revolution speed by the vehicle-propelling pedal 6a which is beforehand set to a low revolution speed range by the fuel lever 23 is favorable in noise and fuel consumption.

Third Embodiment

Figure 7:
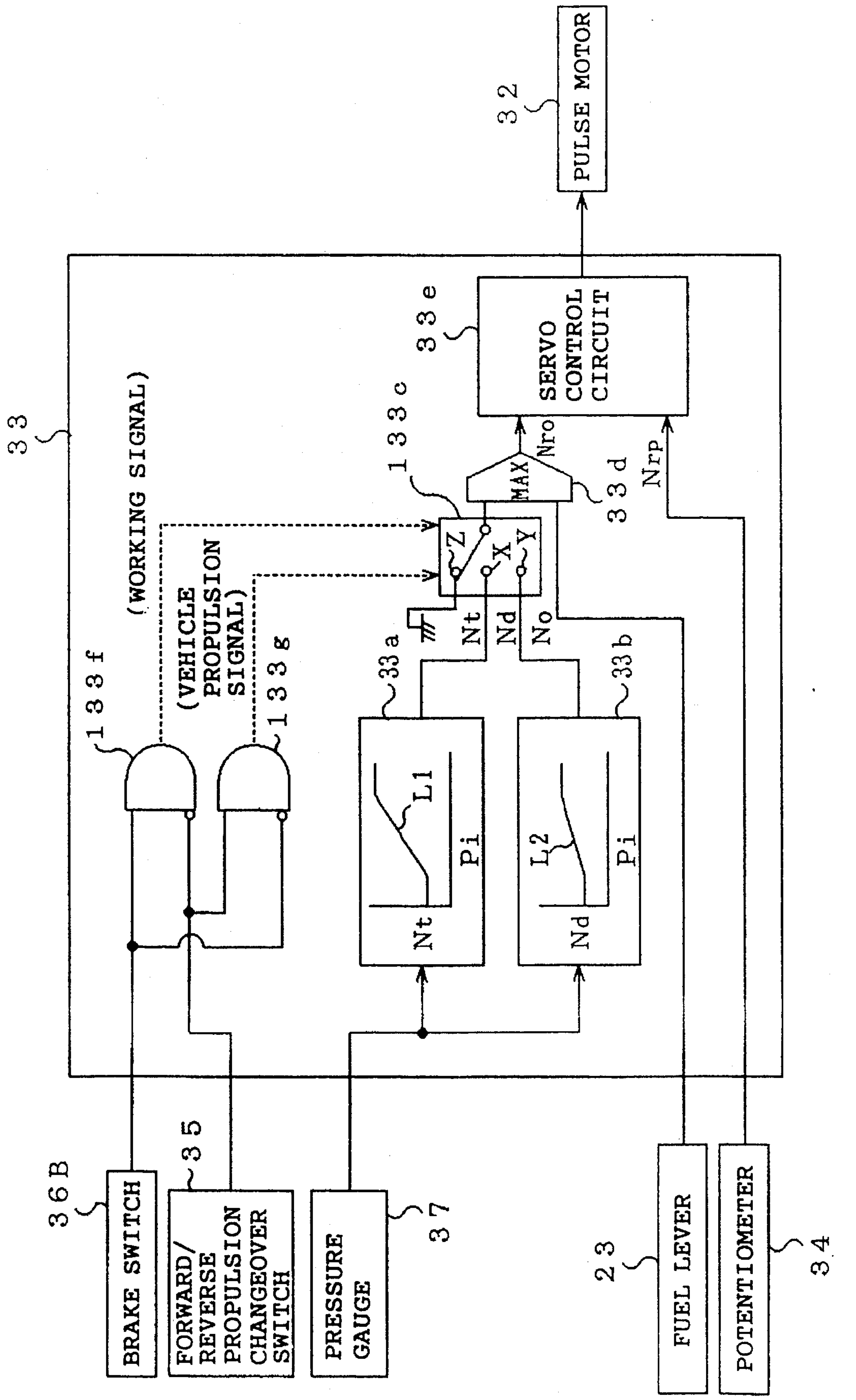
FIGS. 7 and 8 are schematic diagrams showing controllers of third and fourth embodiments.

FIG. 7 is a schematic diagram of another embodiment of the controller 33. The same elements as those of FIG. 5 are represented by the same reference numerals, and the different points from FIG. 5 will be mainly described.

A selection circuit 133c includes a fixed contact point X connected to the function generator 33a for outputting the revolution speed Nt on the basis of the revolution speed characteristic L1 for vehicle propulsion, a fixed contact point Y connected to the function generator 33b for outputting the revolution speed Nd on the basis of the revolution speed characteristic L2 for work, and a fixed contact point Z which is grounded. A movable point a is connected to the maximum value selection circuit 33d in the same manner as described above. The switching operation of the selection circuit 133c is carried out with signals from an AND gate 133f and an AND gate 133g. A non-inversion input terminal of the AND gate 133f is connected to the W terminal of the brake switch 36B, and an inversion terminal thereof is connected to a neutral terminal (not shown) of the forward/reverse propulsion changeover switch 35. An inversion input terminal of the AND gate 133g is connected to the W terminal of the brake switch 36B, and a non-inversion input terminal thereof is connected to a neutral terminal of the forward/reverse propulsion changeover switch 35. When the brake switch 36B is switched to the W position, the W terminal thereof becomes a high level. When the forward/reverse propulsion changeover switch 35 is switched to the neutral position n, the neutral terminal thereof becomes a low level.

In the embodiment as described above, the engine revolution speed is controlled as follows.

When the brake switch 36B is switched to the W position and the forward/reverse propulsion changeover switch 35 is switched to the neutral position n, the output of the AND gate 133f becomes high level, and the selection circuit 133c is switched to the Y contact point. As a result, the revolution speed characteristic L2 for work is selected from the function generator 33b. On the other hand, when the brake switch 36B is switched to the T or P position and the forward/reverse propulsion changeover switch 35 is switched to the forward propulsion position f or reverse propulsion position r, the output of the AND gate 133g becomes high level, so that the selection circuit 133c is switched to the X contact point. As a result, the revolution speed characteristic L1 for vehicle propulsion is selected from the function generator 33a. At a time other than the above two states, the selection circuit 133c is switched to the Z contact point, and a signal indicating a revolution speed lower than the idle revolution speed is selected. The revolution speed thus selected is input to the maximum value selection circuit 33d, and compared with the revolution speed No set by the fuel lever 23 to select larger one of these revolution speeds as the revolution speed Nro. The subsequent controls are identical to those as described above, and the description thereof is omitted.

According to the embodiment as described above, when the brake switch 36B is manipulated to be at the W position and the forward/reverse propulsion changeover switch 35 is manipulated to be at the neutral position n, the engine revolution speed control is carried out to enable the revolution speed characteristic for work by the vehicle-propelling pedal 6a, so that the work can be more surely carried out on the basis of the revolution speed characteristic suitable for the work by the vehicle-propelling pedal 6a while inhibiting the running of the vehicle. In addition, when the brake switch 36B is manipulated to be located at the W position and the forward/reverse propulsion changeover switch 35 is manipulated to be located at the r or f position, and when the brake switch 36B is manipulated to be located at a position other than the W position and the forward/reverse propulsion changeover switch 35 is manipulated to be located at the n position, the Z contact point is selected for the selection circuit 133c, and thus the engine revolution speed is controlled to be certainly set to the target revolution speed No set by the fuel lever 23.

Fourth Embodiment

Figure 8:
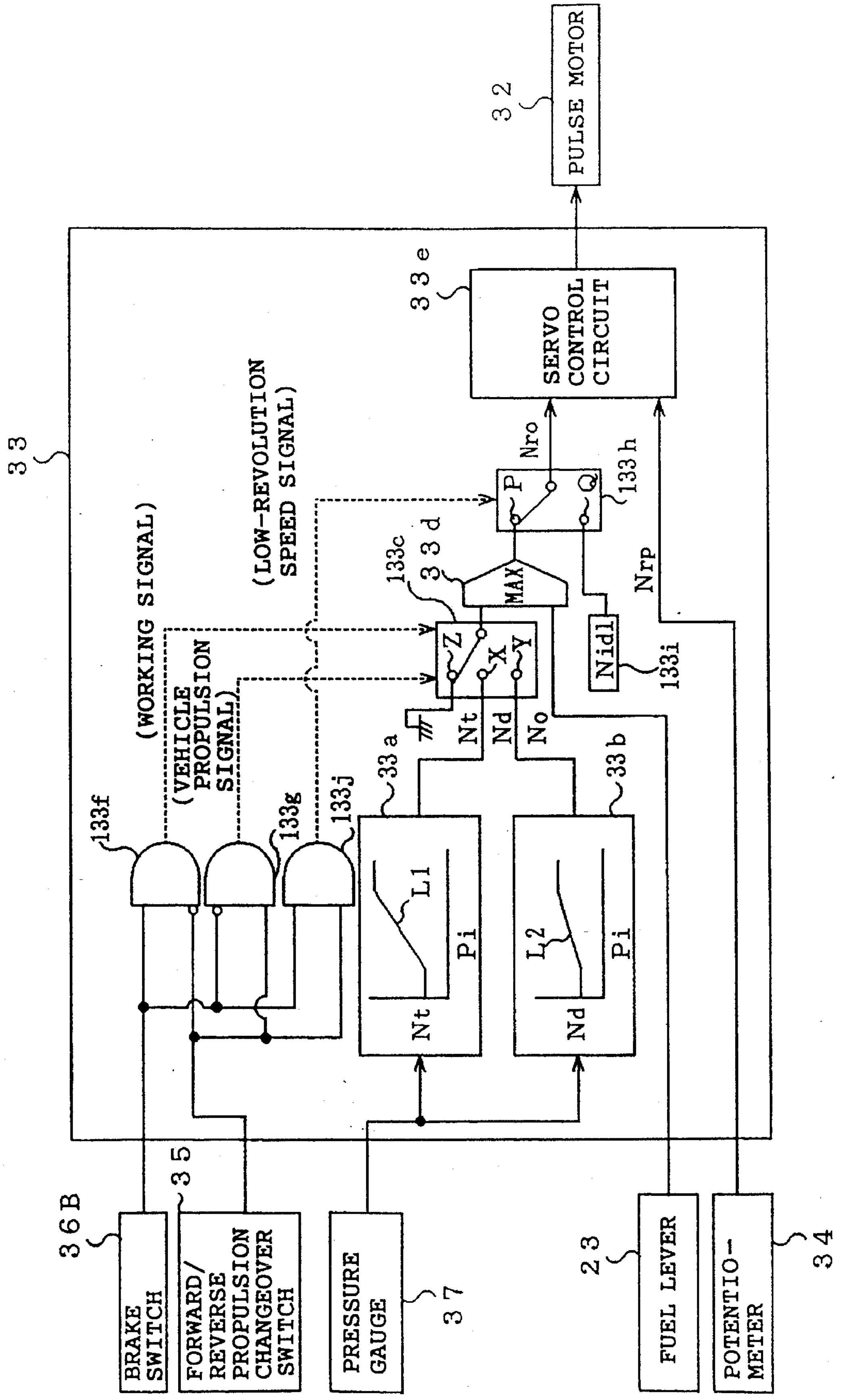

FIG. 8 shows another embodiment of the controller 33. The same elements as those of FIG. 7 are represented by the same reference numerals, and the different points will be mainly described.

Another selection circuit 133h is further provided at the rear stage of the maximum value selection circuit 33d. The fixed contact point P of the selection circuit 133h is connected to the maximum value selection circuit 33d, and the other fixed contact point Q is connected to a signal generator 133i for outputting the idle revolution speed Nidl. The switching operation of this second selection circuit 133h is controlled by the AND gate 133j. One non-inversion input terminal of the AND gate 133j is connected to the W terminal of the brake switch 36B, and the other non-inversion input terminal is connected to the neutral terminal of the forward/reverse propulsion changeover switch 35. Therefore, when the brake switch 36B is switched to the W position and the forward/reverse propulsion changeover switch 35 is switched to the forward or revere position f or r, the two non-inversion input terminals of the AND gate 133j are supplied with high level signals respectively, and the AND gate 133j outputs a high level signal. As a result, the second selection circuit 133h selects the contact point Q, and the idle revolution speed Nidl is selected as the revolution speed Nro, so that the engine revolution speed is controlled to be equal to Nidl.

According to the embodiment as described above, when the vehicle-propelling pedal 6a is erroneously stepped on in a state where the working position is selected for the brake switch 36B and the forward or reverse propulsion is selected for the forward/reverse propulsion changeover switch 35, the braking force and the vehicle propelling force are against each other. However, at this time even if the fuel lever 23 is fully operated, the engine revolution speed is certainly controlled to the idle revolution speed, so that the brake force surpasses the vehicle propelling force, and the erroneous running of the vehicle is prevented to improve the safety.

Figure 9:
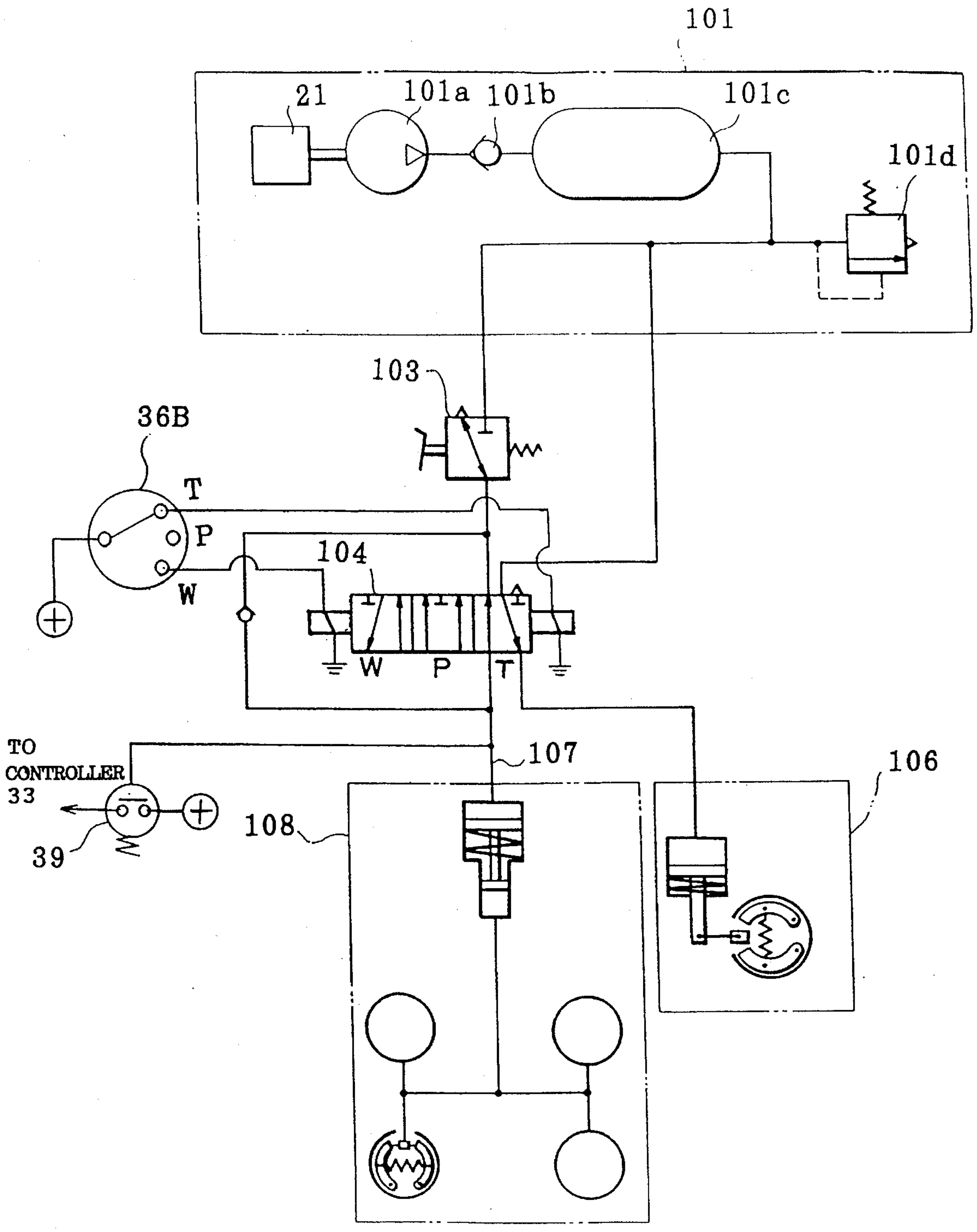
FIG. 9 is a circuit diagram of another embodiment for detecting the actuation of a working brake.

In the embodiments as shown in FIGS. 5 to 8, the signal from the W terminal of the brake switch 36B is input to the controller 33 to detect the selection signal for the working brake, and the signal of the W terminal is connected to the relay coil RC. However, it may be adopted that these wiring are omitted, and an arrangement as shown in FIG. 9 is used. That is, a pressure switch 39 which is closed when a pressure of an input conduit 107 for the main brake device 108 exceeds a predetermined value may be provided, and this signal may be input to the controller 33 to detect the actuation of the working brake.

In this case, the controller 33 may be designed so as to supply current to the relay coil RC in response to a close signal of the pressure switch 39, so that the forward/reverse propulsion changeover valve 80 is switched to the neutral position in the same manner as described above.

Fifth Embodiment

Figure 10:
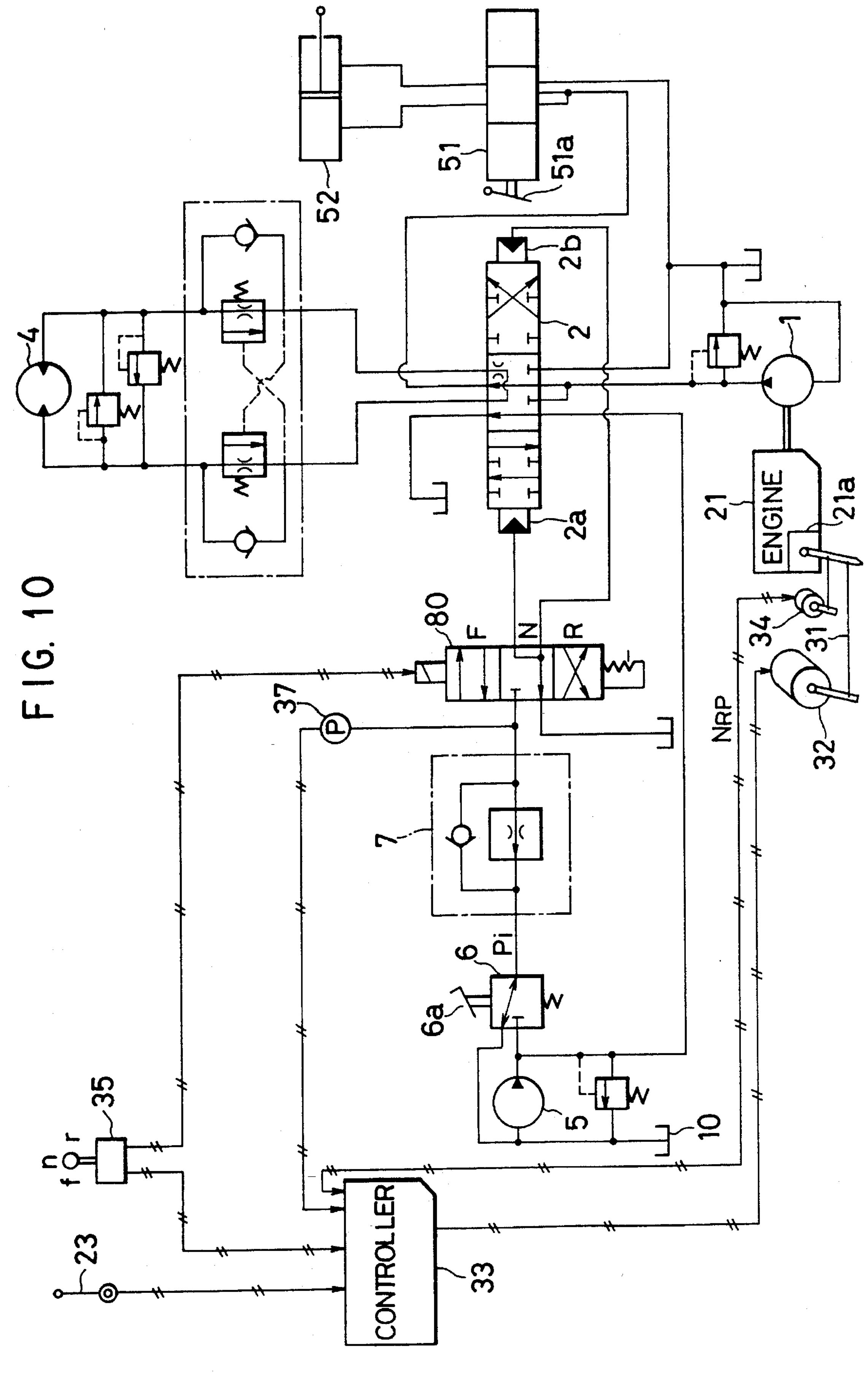
FIGS. 10 and 11 show a fifth embodiment of this invention.
Figure 11:
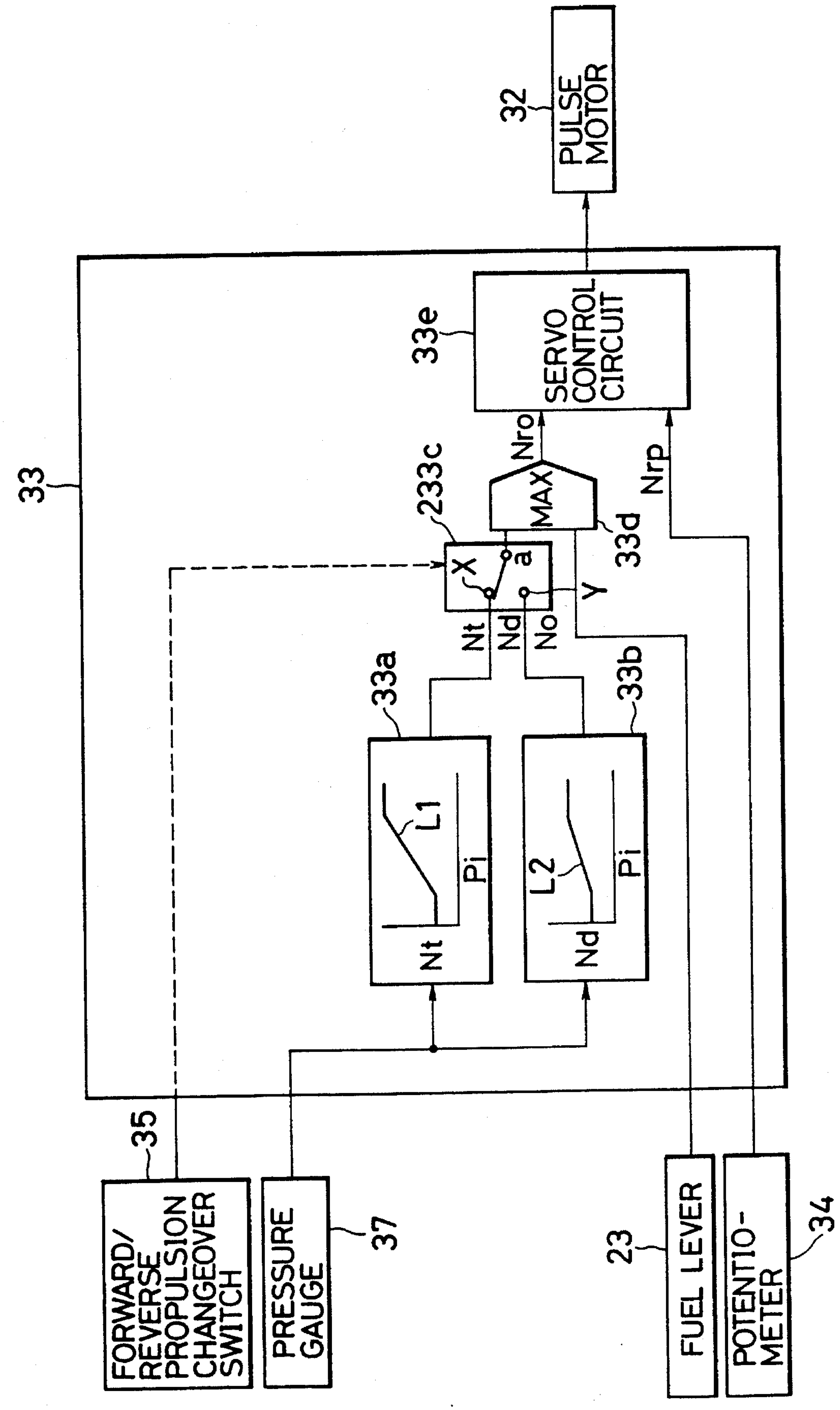

FIGS. 10 and 11 show the whole construction for another embodiment. The same elements as those of FIGS. 5 and 6 are represented by the same reference numerals, and the different points will be mainly described.

This embodiment is so designed that the revolution speed characteristic L2 for work is selected when the neutral position n is selected by the forward/reverse propulsion changeover switch 35, and the revolution speed characteristic L1 for vehicle propulsion is selected when the forward or reverse propulsion position is selected.

To this end, in FIG. 10, the forward/reverse propulsion changeover switch 35 is connected to the controller 33 like the case of FIG. 5, and directly connected to the solenoid portion of the forward/reverse propulsion changeover valve 80 through no relay R. In FIG. 11, the neutral terminal of the forward/reverse propulsion changeover switch 35 is connected to the selection circuit 233c. Therefore, when the forward/reverse propulsion changeover switch 35 is switched to the neutral position n, a low-level signal is input to the control terminal of the selection circuit 233c, and the revolution speed Nd of the revolution speed characteristic L2 for work is selected through the Y contact point.

Sixth Embodiment

Figure 12:
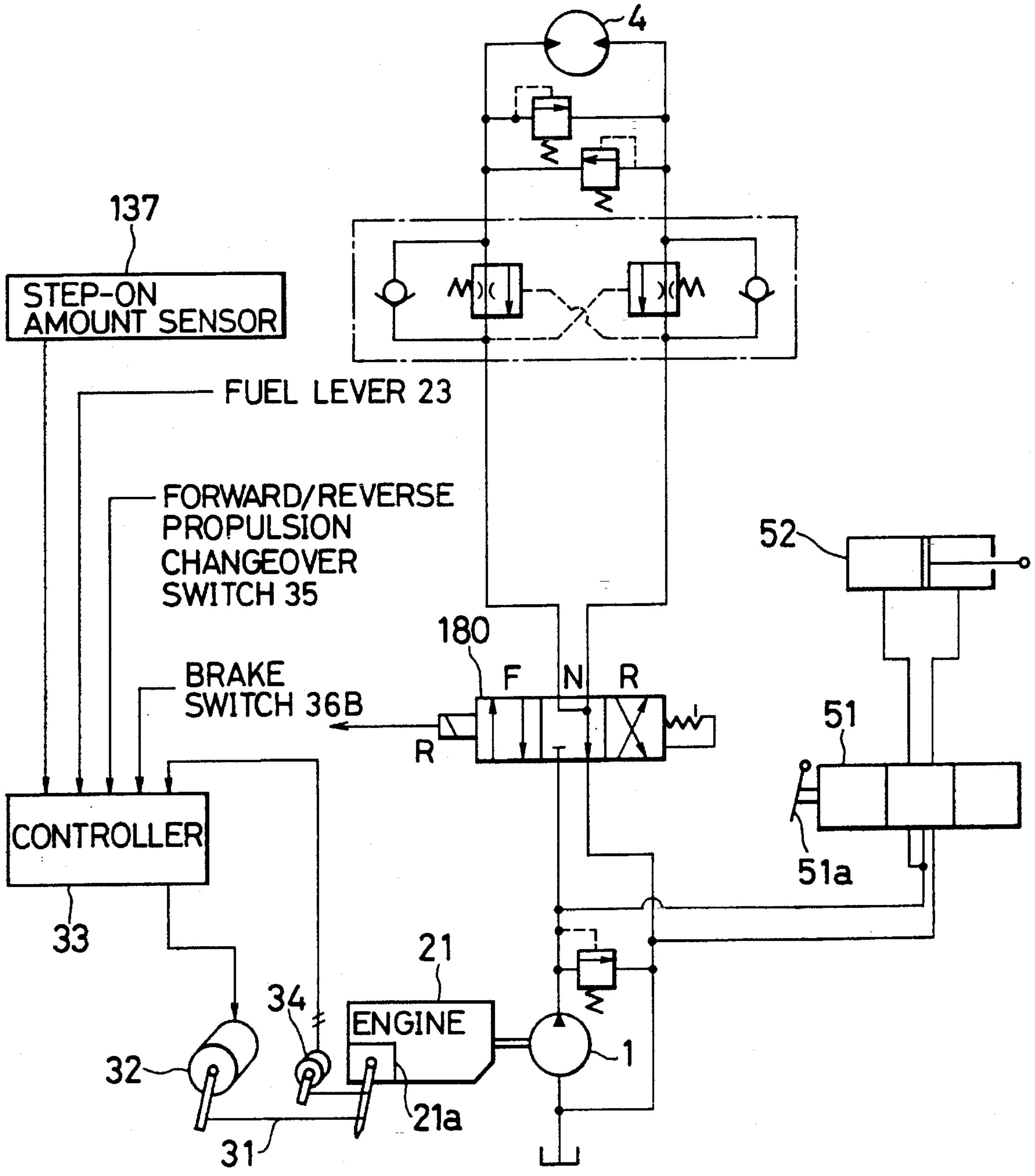
FIG. 12 is a diagram showing the whole construction of a sixth embodiment.

FIG. 12 shows the construction of a main part of another embodiment. The same elements as those of FIG. 5 are represented by the same reference numerals, and the different points will be mainly described.

In FIGS. 5 to 11, the opening amount of the control valve 2 and the engine revolution speed are controlled in accordance with the operation amount of the vehicle-propelling pedal 6a. In this embodiment, the control valve 2 is omitted, and a forward/reverse propulsion changeover valve 180 is provided between the hydraulic pump 1 and the hydraulic motor 4. A detection sensor 137 for detecting the step-on amount of the vehicle-propelling pedal 6a is further provided to control the engine revolution speed in accordance with the step-on amount of the vehicle-propelling pedal 6a. The forward/reverse propulsion changeover valve 180 is switched to each of the N, F and R positions in accordance with the location of the forward/reverse changeover switch 35 at each of the n, f and r positions, and it is forcedly switched to the neutral position N when the brake switch 36B is located at the W position. As described above, the controller 33 controls the engine revolution speed on the basis of the revolution speed characteristic L2 for work when the working brake is actuated, and on the basis of the revolution speed characteristic L1 for vehicle propulsion when the working brake is not actuated.

Accordingly, like the embodiment as described above, the engine revolution speed optimum to the working operation and the vehicle-propelling operation can be used in this embodiment.

In the embodiment as described above, the following advantages are obtainable if the highest revolution speed of the revolution speed characteristic L2 for prime mover which is suitable for the working operation is set to be higher than the highest revolution speed which is set by the fuel lever.

(1) If the revolution speed which is set by the fuel lever is allowed to be set to an extremely high value, there is a possibility that a high revolution speed is usually used. This is unfavorable for durability of an engine, a hydraulic equipment and so on, fuel consumption, noise and etc. In view of this point, if the revolution speed is set as described in this embodiment, the revolution speed by the fuel lever is restricted to a proper revolution speed even if the fuel lever is set to the maximum value, and the revolution speed can be increased to a desired high revolution speed range by the pedal only when it is needed (when a heavy load is applied). Therefore, a desired flow amount is obtainable even when a heavy load is applied, and durability of an engine, a hydraulic equipment and so on can be secured, so that the fuel consumption and the noise can be depressed.

(2) Even when a special attachment requiring a large flow amount such as a breaker, a crusher or the like is mounted, the effect of (1) can be also obtained because the revolution speed can be controlled by the pedal operation.

In the above embodiments, the operation amount of the vehicle-propelling pedal 6a is detected by the pilot pressure gauge 37, however, for example, a potentiometer or the like may be directly secured to the vehicle-propelling pedal 6a to detect the operation amount thereof. Further, the construction of the controller is not limited to the construction as described above, it may be designed such that a processing for selecting a revolution speed characteristic is executed according to a program which is beforehand stored.

Further, in the above embodiments, each of the forward/reverse propulsion changeover valve 80 and 180 is so designed as to be located at the three positions of the neutral, forward-propulsion and reverse-propulsion positions, however, may be constructed by two valves of a changeover valve which is switchable between two positions of forward and reverse propulsion positions and a opening and closing valve.

Still further, in the above embodiments, the working brake is judged to be actuated on the basis of the fact that the brake switch 36B is switched to the W position. However, the actuation of the working brake may be detected by detecting the actual actuation of the parking brake device 106 and the main brake device 108. Likewise, each position of the forward/reverse propulsion changeover valve 80 may be detected on the basis of the actual position of the changeover valve. Further, in the working operation, both of the brake devices 106 and 108 are actuated to actuate the working brake. However, the working brake may be actuated by actuating only one of the parking brake device 106 and the main brake device 108.

INDUSTRIAL APPLICABILITY

This invention is applicable to not only the wheel type hydraulic shovel as described above, but also other hydraulic propelled vehicles.

What is claimed is:

1. A prime mover revolution speed controlling apparatus for a hydraulically propelled vehicle, comprising:

a prime mover;

a hydraulic pump for discharging hydraulic fluid, the discharge amount depending on the revolution speed of said prime mover;

a hydraulic motor for vehicle propulsion which is driven by the hydraulic fluid discharged from said hydraulic pump in a vehicle-propelling operation;

an actuator for work which is driven by the hydraulic fluid discharged from said hydraulic pump in a working operation;

a revolution speed control pedal for indicating a target revolution speed of said prime mover, a depression amount of said revolution speed control pedal corresponding to a target revolution speed;

depression amount detecting means for detecting a depression amount of said revolution speed control pedal;

status detecting means for detecting at least a working operation status; and revolution speed control means for setting a target revolution speed of said prime mover suitable for a working operation in accordance with a depression amount of said revolution speed control pedal when the working operation status is detected by said status detecting means, and for setting a target revolution speed for said prime mover suitable for a vehicle-propelling operation in accordance with a depression amount of said revolution speed control pedal when the working operation status is not detected by at least the status detecting means, wherein a target revolution speed for the vehicle propelling operation is faster than a target revolution speed for the working operation for the same depression amount of the revolution speed control pedal, and for controlling the revolution speed of the prime mover based on the set target revolution speed.

2. The prime mover revolution speed controlling apparatus as claimed in claim 1, further comprising:

manual operation means for outputting a signal indicating the working operation status in response to a manual operation before work is carried out; and inhibiting means for inhibiting vehicle propulsion in response to the output of the signal from the manual operation means.

3. A prime mover revolution speed controlling apparatus for a hydraulically propelled vehicle, including:

a prime mover;

a hydraulic pump for discharging hydraulic fluid, the discharged amount depending on a revolution speed of said prime mover;

a hydraulic motor for vehicle propulsion which is driven by the hydraulic fluid discharged from said hydraulic pump in a vehicle-propelling operation;

an actuator for work which is driven by the hydraulic fluid discharged from said hydraulic pump in a working operation;

a revolution speed control pedal for indicating a revolution speed of said prime mover, a depression amount of said revolution speed control pedal corresponding to a revolution speed;

brake means for restricting the propulsion of the vehicle during a working operation;

brake detecting means for detecting an actuation of said brake means;

depression amount detecting means for detecting a depression amount of said revolution speed control pedal; and revolution speed control means for controlling the revolution speed of said prime mover in accordance with a depression amount of said revolution speed control pedal based on a revolution speed characteristic of said prime mover which is suitable for a working operation when the actuation of said brake means is detected by said brake detecting means, and for controlling the revolution speed of said prime mover in accordance with a depression amount of said revolution speed control pedal based on a revolution speed characteristic of said prime mover which is suitable for a vehicle-propelling operation when at least the actuation of said brake means is not detected by said brake detecting means.

4. A prime mover revolution speed controlling apparatus for a hydraulically propelled vehicle, including:

a prime mover;

a hydraulic pump for discharging hydraulic fluid, the discharge amount depending on the revolution speed of said prime mover;

a hydraulic motor for vehicle propulsion which is driven by the hydraulic fluid discharged from said hydraulic pump in a vehicle-propelling operation;

an actuator for work which is driven by the hydraulic fluid discharged from said hydraulic pump in a working operation;

a revolution speed control pedal for indicating a revolution speed of said prime mover, a depression amount of said revolution speed control pedal indicating a revolution speed;

brake means for restricting the propulsion of the vehicle during a working operation;

changeover means for controlling a supply of hydraulic fluid from said hydraulic pump to said hydraulic motor, said changeover means intercepting the supply of hydraulic fluid to said motor in a neutral position;

brake detecting means for detecting an actuation of said brake means;

depression amount detecting means for detecting a depression amount of said revolution speed control pedal;

switching position detecting means for detecting a switching position of said changeover means; and revolution speed control means for controlling the revolution speed of said prime mover in accordance with a depression amount of said revolution speed control pedal based on a revolution speed characteristic of said prime mover which is suitable for a working operation when the actuation of said brake means is detected by said brake detecting means and said changeover means is judged to be at the neutral position by said switching position detecting means, and for controlling the revolution speed of said prime mover in accordance with a depression amount of said revolution speed control pedal based on a revolution speed characteristic of said prime mover which is suitable for a vehicle-propelling operation when the actuation of said brake means is not detected by said brake detecting means and said changeover means is judged not to be at the neutral position by said switching position detecting means.

5. The prime mover revolution speed controlling apparatus as claimed in claim 4, further comprising changeover control means for switching said changeover means to the neutral position when an actuation of said brake means is detected.

6. The prime mover revolution speed controlling apparatus as claimed in claim 5, wherein said revolution speed control means controls the revolution speed of said prime mover to be equal to a predetermined low revolution speed when an actuation of said brake means is detected and said change-over means is judged to be at a forward or reverse position by said switching position detecting means.

7. The prime mover revolution speed control apparatus as claimed in claim 3, further comprising: revolution speed setting means for setting a revolution speed of said prime mover irrespective of a depression amount of said revolution speed control pedal, and wherein said revolution speed control means includes selection means for selecting the larger one of the prime mover revolution speed set by said revolution speed setting means and the prime mover revolution speed determined in accordance with a depression amount of said revolution speed control pedal based on each of the revolution speed characteristics.

8. A prime mover revolution speed controlling apparatus for a hydraulically propelled vehicle, including:

a prime mover;

a hydraulic pump for discharging pressure oil whose discharge amount depends on the revolution speed of said prime mover;

a hydraulic motor for vehicle propulsion which is driven by the discharge oil from said hydraulic pump in a vehicle-propelling operation;

an actuator for work which is driven by the discharge oil from said hydraulic pump in a working operation;

a vehicle-propelling pedal for controlling a vehicle-propulsion speed in accordance with an operation amount in the vehicle-propelling operation; and changeover means which is switchable to a neutral position where supply of pressure oil to at least said hydraulic motor for vehicle propulsion is intercepted, being characterized by further including:

operation amount detecting means for detecting the operation amount of said vehicle-propelling pedal;

neutral position detecting means for detecting the neutral position of said changeover means; and revolution speed control means for controlling the revolution speed of said prime mover in accordance with the operation amount of said vehicle-propelling pedal on the basis of a revolution speed characteristic of said prime mover which is suitable for the working operation when the neutral position of said changeover means is detected by said neutral position detecting means, and controlling the revolution speed of said prime mover in accordance with the operation amount of said vehicle-propelling pedal on the basis of a revolution speed characteristic of said prime mover which is suitable for the vehicle-propelling operation when the neutral position of said changeover means is not detected by said neutral position detecting means.

9. A prime mover revolution speed controlling apparatus for a hydraulically propelled vehicle, including:

a prime mover;

a hydraulic pump for discharging hydraulic fluid, the discharge amount depending on the revolution speed of said prime mover;

a hydraulic motor for vehicle propulsion which is driven by the hydraulic fluid discharged from said hydraulic pump in a vehicle-propelling operation;

an actuator for work which is driven by the hydraulic fluid discharged from said hydraulic pump in a working operation;

a revolution speed control pedal for indicating a prime mover target revolution speed, a depression amount of said revolution speed control pedal corresponding to a prime mover target revolution speed;

changeover means for controlling a supply of hydraulic fluid from said hydraulic pump to said hydraulic motor, said changeover means intercepting the supply of hydraulic fluid to said hydraulic motor in a neutral position;

depression amount detecting means for detecting a depression amount of said revolution speed control pedal;

switching position detecting means for detecting a switching position of said changeover means; and revolution speed control means for setting the prime mover target revolution speed suitable for a working operation in accordance with a depression amount of said revolution speed control pedal when said changeover means is judged to be at the neutral position by said switching position detecting means, and for setting the prime mover target revolution speed suitable for a vehicle-propelling operation in accordance with a depression amount of said revolution speed control pedal when said changeover means is judged not to be at the neutral position by at least said switching position detecting means, a prime mover target revolution speed being higher for the vehicle propelling operation than for the working operation for the same depression amount of the revolution speed control pedal, and for controlling the prime mover revolution speed based on the set target revolution speed.

10. The prime mover revolution speed controlling apparatus as claimed in claim 9, further including revolution speed setting means comprising:

an operation member provided separately from said revolution speed control pedal, an operation amount of said operation member setting a prime mover target revolution speed irrespective of a depression amount of said revolution speed control pedal; and selection means for selecting the larger one of the target revolution speed set by said operation member and the target revolution speed determined in accordance with a depression amount of said revolution speed control pedal.

11. The prime mover revolution speed controlling apparatus as claimed in claim 10, wherein a maximum value of the target revolution speed suitable for a working operation is set so as to be higher than at least the maximum value of the target revolution speed set by said revolution speed setting means.

* * * * *